(12) United States Patent
Palinkas et al.

(10) Patent No.: US 9,139,045 B2
(45) Date of Patent: Sep. 22, 2015

(54) MULTIPLE HARDNESS NON-PNEUMATIC TIRE

(75) Inventors: Richard L. Palinkas, Northfield, CT (US); George H. Nybakken, Middlebury, CT (US); Ian Laskowitz, Woodbury, CT (US); Christopher J. Maupin, Woodbury, CT (US)

(73) Assignee: Chemtura Corporation, Middlebury, CT (US)

( * ) Notice: Subject to any disclaimer, the term of this patent is extended or adjusted under 35 U.S.C. 154(b) by 841 days.

(21) Appl. No.: 12/266,181

(22) Filed: Nov. 6, 2008

(65) Prior Publication Data

US 2010/0108215 A1    May 6, 2010

(51) Int. Cl.
*B60C 7/00* (2006.01)
*B60C 7/10* (2006.01)

(52) U.S. Cl.
CPC .................................. *B60C 7/102* (2013.04)

(58) Field of Classification Search
CPC ............. B60B 5/02; B60C 7/00; B60C 7/10; B60C 4/102; B60C 2007/107
USPC .................................................. 152/323–329
See application file for complete search history.

(56) References Cited

U.S. PATENT DOCUMENTS

| | | | |
|---|---|---|---|
| 2,709,471 A * | 5/1955 | Smith et al. ................... | 152/310 |
| D201,238 S | 5/1965 | Fishman | |
| 3,219,090 A | 11/1965 | Cislo | |
| 3,396,773 A * | 8/1968 | Alderfer ........................ | 152/313 |
| 4,226,273 A | 10/1980 | Long et al. | |
| 4,294,491 A * | 10/1981 | Black ........................ | 301/64.302 |
| 4,784,201 A | 11/1988 | Palinkas et al. | |
| 4,832,098 A | 5/1989 | Palinkas et al. | |
| 4,855,096 A | 8/1989 | Panaroni | |
| 4,921,029 A | 5/1990 | Palinkas et al. | |
| 4,934,425 A | 6/1990 | Gajewski et al. | |
| 5,023,040 A | 6/1991 | Gajewski et al. | |
| 5,077,371 A | 12/1991 | Singh et al. | |
| 5,139,066 A | 8/1992 | Jarman | |
| D329,413 S | 9/1992 | Chandler | |
| 5,223,599 A | 6/1993 | Gajewski | |
| 5,265,659 A | 11/1993 | Pajtas et al. | |
| 5,343,916 A | 9/1994 | Duddey et al. | |
| 5,460,213 A | 10/1995 | Pajtas | |
| 5,605,657 A | 2/1997 | Nybakken et al. | |
| 5,676,900 A | 10/1997 | Pajtas | |
| 5,703,193 A | 12/1997 | Rosenberg et al. | |
| D401,896 S | 12/1998 | Chandler et al. | |

(Continued)

FOREIGN PATENT DOCUMENTS

| | | |
|---|---|---|
| EP | 159888 | 10/1985 |
| EP | 245789 | 11/1987 |

(Continued)

*Primary Examiner* — Jason Bellinger
(74) *Attorney, Agent, or Firm* — Dilworth IP LLC

(57) ABSTRACT

A non-pneumatic tire comprising one or more radial regions have differing Shore A/Shore D hardness. The non-pneumatic tire comprises side cavities that are staggered with respect to laterally opposing side cavities, and laterally extending tread grooves that are in substantial radial alignment with or substantially offset relative to the cavities. One radial region may comprising the side cavities, while another radial region with a different hardness comprises the tread grooves. Also provided are processes for making such tires and to off-the-road (OTR) vehicles employing such tires.

17 Claims, 14 Drawing Sheets

(56) References Cited

U.S. PATENT DOCUMENTS

| | | |
|---|---|---|
| 5,906,836 A | 5/1999 | Panaroni et al. |
| D410,603 S | 6/1999 | Chandler et al. |
| 6,170,544 B1 | 1/2001 | Hottebart |
| D455,996 S | 4/2002 | Buckley |
| 6,431,235 B1 | 8/2002 | Steinke |
| 6,450,222 B1 | 9/2002 | Fleming |
| 6,592,189 B1 | 7/2003 | Back, Sr. |
| 6,681,822 B2 | 1/2004 | Adams et al. |
| 6,723,771 B2 | 4/2004 | Palinkas et al. |
| D498,203 S | 11/2004 | Shapiro et al. |
| D499,065 S | 11/2004 | Shapiro et al. |
| 7,013,939 B2 | 3/2006 | Rhyne et al. |
| 7,090,306 B1 | 8/2006 | Piper |
| 7,125,083 B2 | 10/2006 | Piumarta et al. |
| D536,298 S | 2/2007 | Becker et al. |
| 7,174,936 B2 | 2/2007 | Becker et al. |
| 7,201,194 B2 | 4/2007 | Rhyne et al. |
| D548,681 S | 8/2007 | Becker et al. |
| 2003/0065124 A1 | 4/2003 | Rosenberg et al. |
| 2005/0028914 A1 | 2/2005 | Hill, III et al. |
| 2007/0089820 A1 | 4/2007 | Gabrys et al. |
| 2007/0119531 A1 | 5/2007 | Steinke et al. |
| 2007/0215259 A1 | 9/2007 | Burns |
| 2007/0267116 A1 | 11/2007 | Rhyne et al. |

FOREIGN PATENT DOCUMENTS

| | | |
|---|---|---|
| EP | 297628 | 1/1989 |
| EP | 334522 | 9/1989 |
| EP | 353006 | 1/1990 |
| EP | 399383 | 11/1990 |
| EP | 502353 | 9/1992 |
| GB | 228495 | 11/1925 |
| GB | 2431383 | 4/2007 |
| WO | 8905736 | 6/1989 |
| WO | 9514582 | 6/1995 |
| WO | 9718959 | 5/1997 |
| WO | 9843833 | 10/1998 |
| WO | 03018332 | 3/2003 |
| WO | 2008009042 | 1/2008 |

\* cited by examiner

MULTIPLE HARDNESS NON-PNEUMATIC TIRE

BACKGROUND OF THE INVENTION

1. Field of the Invention

This invention relates to tires and more particularly to non-pneumatic tires that preferably are suitable for off-the-road vehicles. The non-pneumatic tires have multiple radial regions of differing hardness and preferably an outer radial region that is harder than an inner radial region.

2. Discussion of the Background Information

Off-the-road (OTR) vehicles, also known as off-highway vehicles, are commonly used in rugged terrain for mining, excavation, construction, military applications, and other heavy industrial applications. OTR vehicles include tractors, trucks, loaders, dozers, graters, excavators, etc., and may have operational weights as high as 380 to 460 tons. Typically such OTR vehicles have several inflatable tires made of rubber. These applications require that each tire have properties such as being puncture-proof, able to carry relatively heavy loads, and good resistance to wear and tear. Conventional inflatable tires generally have short operational life spans of about six months. Further, the typical rugged operating environment for OTR vehicles exposes the tires to possible failures, such as punctures, blowouts, tears, and separation of the tire from the rim. Thus, the time and cost to maintain such OTR vehicles increases because the inflatable tires need to be replaced due to normal wear and tire failure. For mining vehicles, for example, shortages of suitable replacement tires may cause a mine operator to shut down production while waiting for new replacement tires. This may cause particular hardships for remotely located mines that receive sporadic or irregular shipments of new supplies.

While improvements in the durability of such inflatable tires continue to be made, such tires are still exposed to normal wear and failure. Thus, the need exists for tires suitable for OTR vehicles that overcome the shortcomings of conventional inflatable tires.

One solution is to use a solid non-pneumatic tire. Urethane elastomers have been used in the manufacture of solid tires for such applications as industrial tires, off-the-road tires, bicycles tires, etc. Urethane solid tires, however, have not been entirely satisfactory in such applications because they do not have desirable cushioning and handling characteristics. Also, such solid tires suffer from internal heat build-up and subsequent degradation of the elastomer material in prolonged high speed service conditions or under rough terrain situations where the tire is being deformed. Various non-pneumatic tire designs have been proposed to overcome these limitations of pneumatic tires and solid non-pneumatic tires.

Some designs of non-pneumatic tires have cavities formed into the sidewall, such as those described in International Publications WO2008/009042 and WO97/18959, U.S. Publication No. 2007/0215259, U.S. Pat. Nos. 7,174,936, 5,676,900, 5,343,916, 5,223,599, 5,139,066, 5,023,040, 4,921,029, 4,784,201, and EP Publication 0399383, the entire contents and disclosures of which are hereby incorporated by reference. Metal bands are often used as a reinforcement means to provide support in these non-pneumatic tire designs. Also, some of the non-pneumatic tires incorporate a separate rubber tread.

Some designs of non-pneumatic tires have resilient members that create openings laterally through the sidewall, such as those described in U.S. Publication No. 2007/0089820 and U.S. Pat. Nos. 7,201,194, 7,013,939, 6,681,822, 6,170,544, 4,945,962, 4,226,273, and 3,219,090, and EP Publication 0353006, the entire contents and disclosures of which are hereby incorporated by reference.

Various tire ornamental designs for pneumatic and non-pneumatic tires, including industrial tires, have also been proposed, such as those shown in U.S. Design Pat. No. D201,238, D329,413, D401,896, D410,603, D455,996, D498,203, D499,065, D536,298, and D548,681, the entire contents and disclosures of which are hereby incorporated by reference.

However, there is still a need for improved non-pneumatic tires, particularly for use in large off-the-road vehicles.

SUMMARY OF THE INVENTION

In a first aspect of the present invention, there is provided a non-pneumatic tire comprising: a first radial region formed of a first polyurethane material having a Shore A hardness of 70A to 95A, e.g., from 80A to 90A, or more preferably from 85A to 89A; and a second radial region comprising a tread surface, wherein the second radial region is formed of a second polyurethane material having a Shore A/D hardness of 85A to 60D, e.g., from 90A to 50D, or more preferably from 92A to 95A, and wherein the second radial region is harder than the first radial region.

In a second aspect of the present invention, there is provided a non-pneumatic tire comprising: first radial region comprising side cavities that are staggered with respect to laterally opposing side cavities; and second radial region comprising laterally extending tread grooves that are in substantial radial alignment with the cavities, wherein the first radial region is formed of a first polyurethane material having a Shore A hardness of 70A to 95A, e.g., from 80A to 90A, or more preferably from 85A to 89A, and the second radial region is formed of a second polyurethane material having a Shore A/D hardness of 85A to 60D, e.g., from 90A to 50D, or more preferably from 92A to 95A.

In a third aspect of the present invention, there is provided a non-pneumatic tire comprising: first radial region comprising side cavities that are staggered with respect to laterally opposing side cavities; and second radial region comprising laterally extending tread grooves that are in substantial radial alignment with the cavities, wherein the second radial region is formed of a second polyurethane material having a Shore A hardness that is at least 2A, e.g., at least a difference of 3A, at least a difference of 4A or at least a difference of 5A, greater than a first polyurethane used to form the first radial region.

In a fourth aspect of the present invention, there is provided a non-pneumatic tire comprising: a central web connecting inner and outer circumferential members; first radial region comprising ribs extending from opposing sidewalls to the central web and defining side cavities, wherein ribs on one side of the central web are staggered relative to ribs on an opposite side of the central web; and second radial region comprising laterally extending tread grooves embedded in an outer surface of the outer circumferential member and extending inwardly from respective sides of the tire, wherein the tread grooves are substantially offset relative to the ribs; and wherein the first radial region is formed of a first polyurethane material having a Shore A hardness of 70A to 95A, e.g., from 80A to 90A, or more preferably from 85A to 89A, and the second radial region is formed of a second polyurethane material having a Shore A/D hardness of 85A to 60D, e.g., from 90A to 50D, or more preferably from 92A to 95A.

In a fifth aspect of the present invention, there is provided a non-pneumatic tire comprising: first radial region comprising side cavities that are staggered with respect to laterally opposing side cavities; and second radial region comprising laterally extending tread grooves that are substantially offset relative to the cavities, wherein the first radial region is formed of a first polyurethane material having a Shore A hardness of 70A to 95A, e.g., from 80A to 90A, or more preferably from 85A to 89A, and the second radial region is formed of a second polyurethane material having a Shore A/D hardness of 85A to 60D, e.g., from 90A to 50D, or more preferably from 92A to 95A.

In one embodiment according to any of the aspects of present invention there may be provided a third radial region formed of a third polyurethane material having a Shore A/D hardness of 60A to 60D, e.g., from 85A to 50D, or more preferably from 90A to 95A.

In one embodiment, the first radial region is a central radial region may have a height that is approximately from 5-45%, e.g., 5-35% or from 10-25%, of the tire's sidewall height. Preferably the central region includes the cavities, ribs and web and optionally when no inner region is provided, is disposed near the rim of the tire. In one embodiment the second radial region is an outer radial region may have a height that is approximately from 40-95%, e.g., 65-95% or from 75-90%, of the tire's sidewall height. Preferably the outer region includes the tread of the tire. In another embodiment, the third radial region is an inner radial region may have an height that is approximately 5-55%, e.g., 5-45% or from 10-25%, of the tire's sidewall height. Preferably, when present, the inner radial region is disposed between the rim and central radial region.

In embodiments the present invention the polyurethane may be a reaction product of a diisocyanate, polyol and a curative selected from the group consisting of polyol curatives or diamine curatives. Suitable diisocyanates are selected from the group consisting of diphenylmethane diisocyanate (MDI), toluene diisocyanate (TDI), para-phenylene diisocyanate (PPDI), 1,6-hexane diisocyanate (HDI), isophorone diisocyanate (IPDI), 3,3'-bitoluene diisocyanate (TODI), 1,4-cyclohexyl diisocyanate (CHDI), naphthalene-1,5-diisocyanate (NDI), and methylene bis(p-cyclohexyl isocyanate) ($H_{12}MDI$). Suitable polyols are selected from the group consisting of polycaprolactone, polyester, poly(adipate)glycol, poly(hexamethylene adipate)glycol, poly(ethylene adipate) glycol, poly(diethylene adipate)glycol, poly(ethylene/propylene adipate)glycol, poly(oxypropylene)-poly(oxyethylene) glycol, poly(trimethylolpropane/hexamethylene adipate) glycol, poly(ethylene/butylene adipate)glycol, poly(butylene adipate)glycol, poly(hexamethylene/neopentyl adipate)glycol, poly(butylene/hexamethylene adipate)glycol (PBHAG), poly(neopentyl adipate)glycol, poly(tetramethylene ether)glycol (PTMEG), polyether, and polyalkyleneether polyols. Suitable curatives are selected from the group consisting of 4,4'-methylene-bis(2-chloroaniline) (MBCA); 4,4'-methylene-bis(3-chloro-2,6-diethylaniline (MCDEA); diethyl toluene diamine (DETDA; Ethacure™ 100 from Albemarle Corporation); tertiary butyl toluene diamine (TBTDA); dimethylthio-toluene diamine; trimethylene glycol di-p-amino-benzoate; methylene bis orthochloroaniline (MOCA), methylene bis diethylanaline (MDEA); methylenedianiline (MDA); MDA-sodium chloride complex; isobutyl 3,5-diamino-4-chlorobenzoate, ethylene glycol, diethylene glycol, dipropylene glycol, neopentyl glycol, 1,3-butanediol, 1,4-butanediol, hydroquinone-bis-hydroxyethyl ether (HQEE), and cyclohexyldimethanol (CHDM).

In one embodiment there is provided a vehicle, e.g., an OTR vehicle, comprising one or more of the non-pneumatic tires of any of the embodiments or aspects of the present invention.

In a sixth aspect of the present invention, there is provided a process for forming a non-pneumatic tire comprising: forming a first polyurethane in a first radial region to a Shore A hardness of 70A to 95A; and forming a second polyurethane in a second radial region to a Shore A/D hardness of 85A-60D, wherein the second radial region is near the tire's tread. In one embodiment, the process is a spin-casting method.

BRIEF DESCRIPTION OF THE DRAWINGS

The foregoing and other objects and advantages of our invention will appear more fully from the following description, made in connection with the accompanying drawings of non-limiting preferred embodiments of the inventions, wherein like characters refer to the same or similar parts throughout the views, and in which.

DETAILED DESCRIPTION OF THE PREFERRED EMBODIMENTS

Figure 1A:
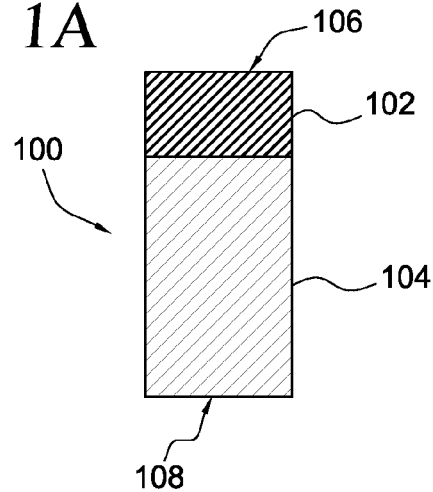
FIG. 1A is a cross-sectional view of a tire having two radial regions of differing hardness in accordance with an embodiment of the present invention.
Figure 1B:
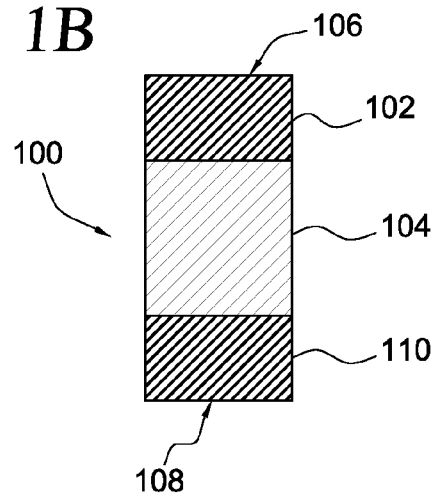
FIGS. 1B and 1C are cross-sectional views of a tire having three radial regions in accordance with an embodiment of the present invention.
Figure 1C:
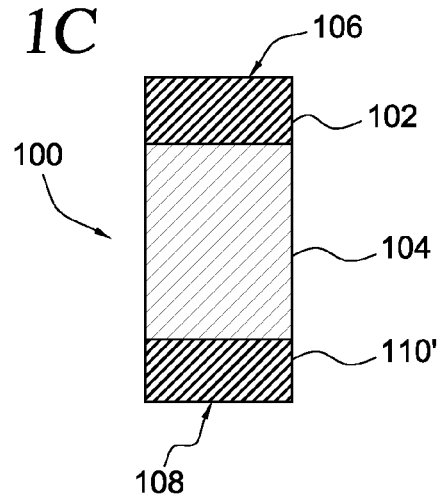

The embodiments of the invention are directed to tires and, more specifically, to non-pneumatic tires having a plurality of regions of differing hardness, and that preferably are capable of carrying extreme loads. Tires according to the embodiments ideally are well-suited for off-the-road (OTR) vehicles and applications and are preferably capable of individually withstanding tremendous loads of, for example, greater than 5 tons, greater than 30 tons or greater than 65 tons. In some exemplary embodiments, non-pneumatic tires have radial regions of differing hardness as shown in FIGS. 1A-1C. Tire 100, as shown in FIG. 1A, comprises an outer radial region 102 that is harder than a central radial region 104. The outer radial region 102 is near and may include the tire tread 106, while the central radial region 104 is near the inner circumference 108 of the tire 100, and when mounted to a vehicle, near the rim. As shown in FIG. 1A, central radial region 104 is near to the inner circumference 108 and may also be referred to as the inner radial region. Outer radial region 102 preferably has a Shore A/D hardness of from 85A to 60D, e.g., from 90A to 50D, or more preferably from 92A to 95A. Central radial region 104 preferably has a Shore A hardness of from 70A to 95A, e.g., 80A to 90A, or more preferably 85A to 89A.

Thus, in one embodiment, the outer radial region 102 has a hardness that is greater than the hardness of the central radial region 104. In one embodiment the difference between the outer radial region 102 and central radial region 104 is at least a Shore A hardness of 2A, e.g., at least a difference of 3A, at least a difference of 4A or at least a difference of 5A, such that the outer radial region 102 is harder than the central radial region 104. For example, when the central radial region 104 has a hardness of 90A, the outer radial region has a hardness of at least 92A or greater.

Although one central radial region is shown in FIG. 1A also being the inner radial region, in further embodiments of the present invention there may be an additional inner radial regions 110, 110' as shown in FIGS. 1B-1C. The inner radial region 110, 110' may have a Shore A/D hardness of from 60A to 60D, e.g., from 80A to 50D, or more preferably from 90A to 95A. In FIG. 1B, inner radial region 110 is made of the same material as outer radial region 102 and has the same hardness, preferably a Shore A/D hardness of from 85A to 60D, e.g., from 90A to 50D, or more preferably from 93A to 95A.

In FIG. 1C inner radial region 110' has a hardness that is either greater or less than the hardness of central radial region 104. For example, inner radial region 110' when less than the hardness of central radial region 104 preferably has a Shore A hardness of from 60A to 90A, e.g., from 65A to 85A, or more preferably from 70A to 80A. Preferably, inner radial region 110' also has a hardness that is different from outer radial region 102, e.g. inner radial region 110 has a hardness that is less than the hardness of outer radial region 102. In one embodiment the difference between the central radial region 104 and inner radial region 110' is at least a Shore A hardness of 2A, e.g., at least a difference of 3A, or at least a difference of 5A. Also, since outer radial region 102 is harder than central radial region, the difference between the inner radial region 110' and outer radial region 102 is at least a Shore A hardness of 4A, e.g., at least a difference of 5A, or at least a difference of 6A.

In another embodiment, inner radial region 110' shown in FIG. 1C has a hardness that is greater than the hardness of central radial region 104. Inner radial region 110' has a Shore A/D hardness of from 60A to 60D, e.g., from 85A to 50D, or more preferably from 90A to 95A. Preferably, inner radial region 110' also has a hardness that is different from outer radial region 102. Thus, since inner radial region 110' is harder than central radial region 104, and central radial region differs by at least a Shore A hardness of 2A from outer radial region 102, then inner radial region 110' may be slightly softer than outer radial region 102, e.g., by a Shore A hardness of less than 2A, less than 1A, or may be harder than outer radial region 102. When inner radial region 110' is harder than both outer radial region 102 and central radial region 104, the difference between inner radial region 110' and outer radial region 102 is a Shore A hardness of at least 2A, e.g., at least 3A or at least 4A.

It is further contemplated by the embodiments that additional outer, central and inner radial regions may be included in the tire without varying from the scope of the present invention.

Preferably, any of the inner, central and outer radial regions have a substantially uniform hardness that does not vary by more than 2.0%, e.g., more than 1.5%, or more than 1.0% throughout the respective radial region.

Figure 2A:
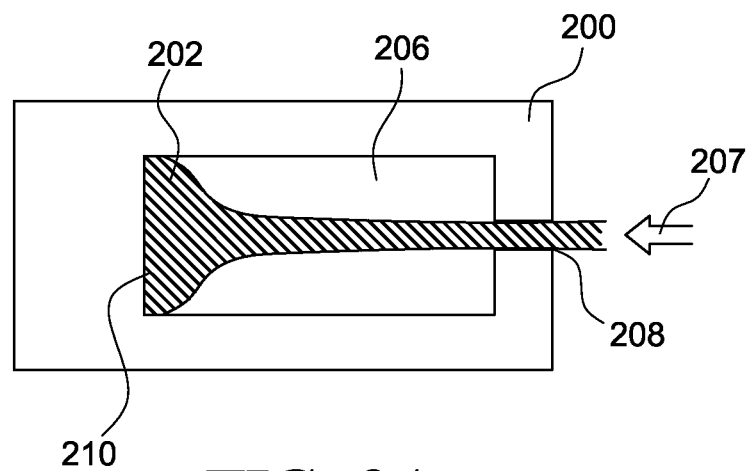
FIG. 2A is a cross-section view of an outer radial region formed in a mold in accordance with an embodiment of the present invention.
Figure 2B:
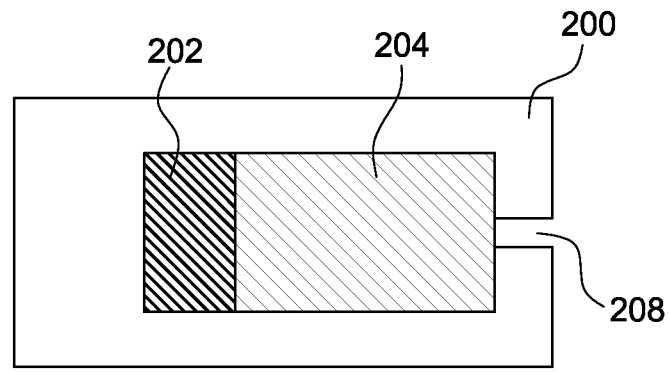
FIG. 2B is a cross-section view of an inner radial region formed adjacent to the outer radial region of FIG. 2A.

Generally, such tires with hardness regions as shown in FIGS. 1A-1C may be formed using several different methods. In particular, spin-casting processes are preferred. FIG. 2A shows a cross-section of a mold 200 having a mold cavity 202. A further mold of an embodiment of the present invention is described in more detail in FIG. 9A and FIG. 9B. During the molding process, mold 200 is rotated in a horizontal or vertical plane. A first polyurethane mixture is used to form the outer region 202 is injected through insert hole 208 as shown by arrow 207. The amount of the first mixture is less than the volume of the mold cavity 206 and is preferably less than 45% of the volume of the cavity, e.g., less than 35%, less than 25% or less than 15%. The first mixture travels from the insert hole 208 to the outer circumference 210 of mold cavity 206. In the spin-casting method, the mixture travels to the outer circumference 210 as a result of the centrifugal force caused by the rotation of mold 200. After outer region 202 is cured, a second polyurethane mixture is introduced to fill the remaining volume of the mold cavity 206. This second mixture is injected through the same hole 208, or alternatively, is injected through a separate hole. The amount of the other second mixture equals the remaining volume of the mold cavity 206 and is preferably 55-85%, e.g., 60-80% or 65-75%, of the volume of the cavity. The spinning rate of the mold 200 when the second mixture for the central/inner radial region is introduced needs to be controlled such that the material for the central/inner radial region does not penetrate through the outer radial region. Once cured this second mixture forms the central/inner region 204 as shown in FIG. 2B. Although the embodiments may be formed using spin-casting, other methods such as open casting, injection molding, and rotational casting may also be used to form a tire having hardness regions.

In one embodiment, no adhesive is necessary to bond the hardness regions together. Instead the molecular bond between the regions forms a boundary region that adheres the regions together. In further embodiments, an adhesive may be used to further strength the boundary region between hardness regions.

By employing an outer region of that is harder than the central region, the tires in one embodiment of the invention are generally more resistant to tears. Typically OTR vehicles operate in harsh conditions and encounter several types of debris that is on the ground, such as but not limited to, rocks, trees, lumber, metal scraps, load spillage, blocks of concrete, etc. Thus, the operational lifetime of a tire having an harder outer region according to embodiments of the invention may be increased when the tear and abrasive wear characteristics of the tire are improved.

In other embodiments, the central region that is less hard than the outer region may be advantageous to improve ride characteristics. In addition, a relatively softer central region may reduce the vibrations caused by the tire compared to harder non-pneumatic tire. The relatively softer central region may further reduce the ground pressure of the tire.

In other embodiments that have an inner radial in addition to the central region may also be advantageous. For example an inner radial region having a relatively harder material provides a transition to the metal rim, and may, if hard enough, also reduce the size of the rim. Also, for example, a relatively softer inner radial region may further reduce the vibrations caused by the tire as well as the tire pressure.

Non-pneumatic tires of the embodiments having regions of differing hardness may be used tire configurations such as those described in U.S. application Ser. No. 12/036,939, entitled "Non-Pneumatic Tire," and filed Feb. 25, 2008, U.S. application Ser. No. 12/036,951, entitled "Modular Tire Assembly," and filed Feb. 25, 2008, and U.S. application Ser. No. 12/257,740, entitled "Non-Pneumatic Tire Having Angled Tread Groove Wall," and filed Oct. 24, 2008, the entire contents and discloses of which are hereby incorporated by reference. In one embodiment, the invention relates to a non-pneumatic tire having: (a) an central radial region comprising side cavities that are staggered with respect to laterally opposing side cavities; and (b) an outer radial region comprising laterally extending tread grooves that are in substantial radial alignment with the cavities, wherein the central radial region is formed of a first polyurethane material having a Shore A hardness of from 70A to 95A, e.g., from 80A to 90A, or more preferably from 85A to 89A, and the outer radial region is formed of a second polyurethane material having a Shore A/D hardness of from 85A to 60D, e.g., from 90A to 50D, or more preferably from 92A to 95A. In another embodiment, the invention relates to a non-pneumatic tire having: (a) an central radial region comprising side ribs (which preferably define the above-described cavities) that are staggered with respect to laterally opposing side ribs; and (b) an outer radial region comprising laterally extending tread grooves that are substantially offset relative to the ribs, wherein the central radial region is formed of a first polyurethane material having a Shore A hardness of from 70A to 95A, e.g., from 80A to 90A, or more preferably from 85A to 89A, and the outer radial region is formed of a second polyurethane material having a Shore A/D hardness of from 85A to 60D, e.g., from 90A to 50D, or more preferably from 92A to 95A.

In a further embodiment, the invention relates to a non-pneumatic tire having: (a) an inner region comprising side cavities that are staggered with respect to laterally opposing side cavities; and (b) an outer region comprising laterally extending tread grooves that are in substantial radial alignment with the cavities and the tread grooves have at least one wall that is angled with respect to the radial direction, i.e., the direction relative to the tire's axis of rotation, and wherein the central radial region is formed of a first polyurethane material having a Shore A hardness of from 70A to 95A, e.g., from 80A to 90A, or more preferably from 85A to 89A, and the outer radial region is formed of a second polyurethane material having a Shore A/D hardness of from 85A to 60D, e.g., from 90A to 50D, or more preferably from 92A to 95A. In a preferred embodiment, the polyurethane material is not a foam material.

As used herein, the term "lateral" and variations thereof refers to the direction substantially parallel to the axis of rotation of the tire or tire rim. The outer and inner regions comprising ribs, side cavities and/or tread grooves, respectively, may be formed together in the same mold to structurally integrated the ribs, side cavities and/or tread grooves.

According to one embodiment of the invention circumferentially adjacent cavities in the tire are separated from one another by the ribs, which extend from a side of the tire to a central web. Like the cavities that are defined by the ribs, the ribs themselves preferably are staggered with respect to laterally opposing ribs. The ribs may be radially oriented, meaning the ribs extending in the radial direction relative to the tire's axis of rotation, or may be oriented at one or more angles relative to the radial direction. In the latter embodiment, the angle preferably is less than 60 degrees, e.g., less than 30 degrees, less than 20 degrees, less than 15 degrees, or less than 10 degrees, relative to the radial direction. In terms of ranges, the rib angle optionally is from 0 to 60 degrees, e.g., from 1 to 30 degrees, or from 5 to 25 degrees, relative to the radial direction. Generally, the smaller the angle, the greater the load the tire will be able to withstand and the longer the tire lifetime. For particularly heavy loads, the ribs preferably are radially oriented, i.e., oriented at 0 degrees relative to the radial direction. Conversely, the tires tend to exhibit greater compressibility, which may be desired, for example, for particularly rugged terrains, as the rib angle increases relative to the radial direction.

Figure 3A:
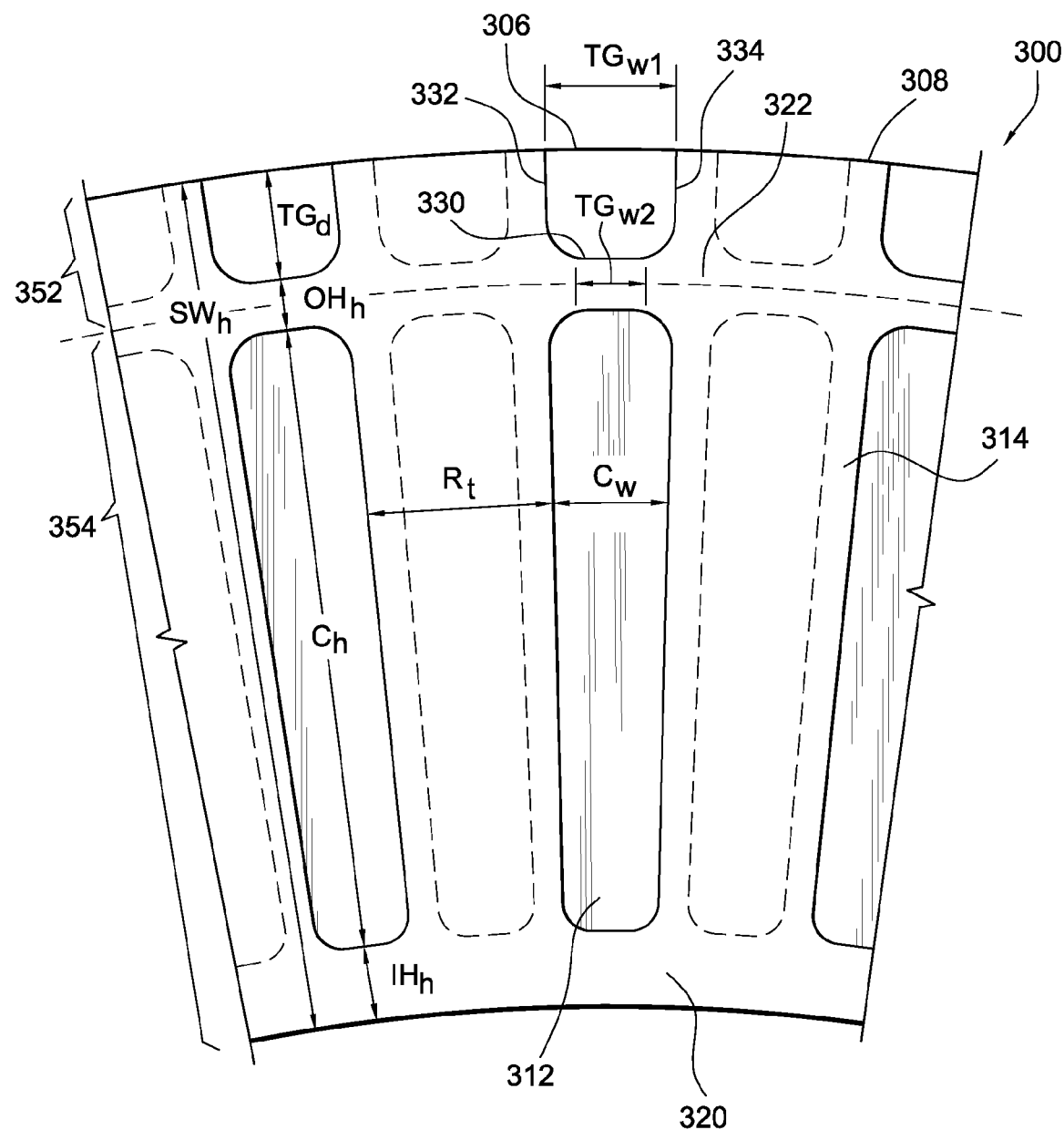
FIG. 3A is a detailed side view of a tire constructed in accordance with one embodiment of the present invention in which laterally extending tread grooves are in substantial radial alignment with the cavities.
Figure 4A:
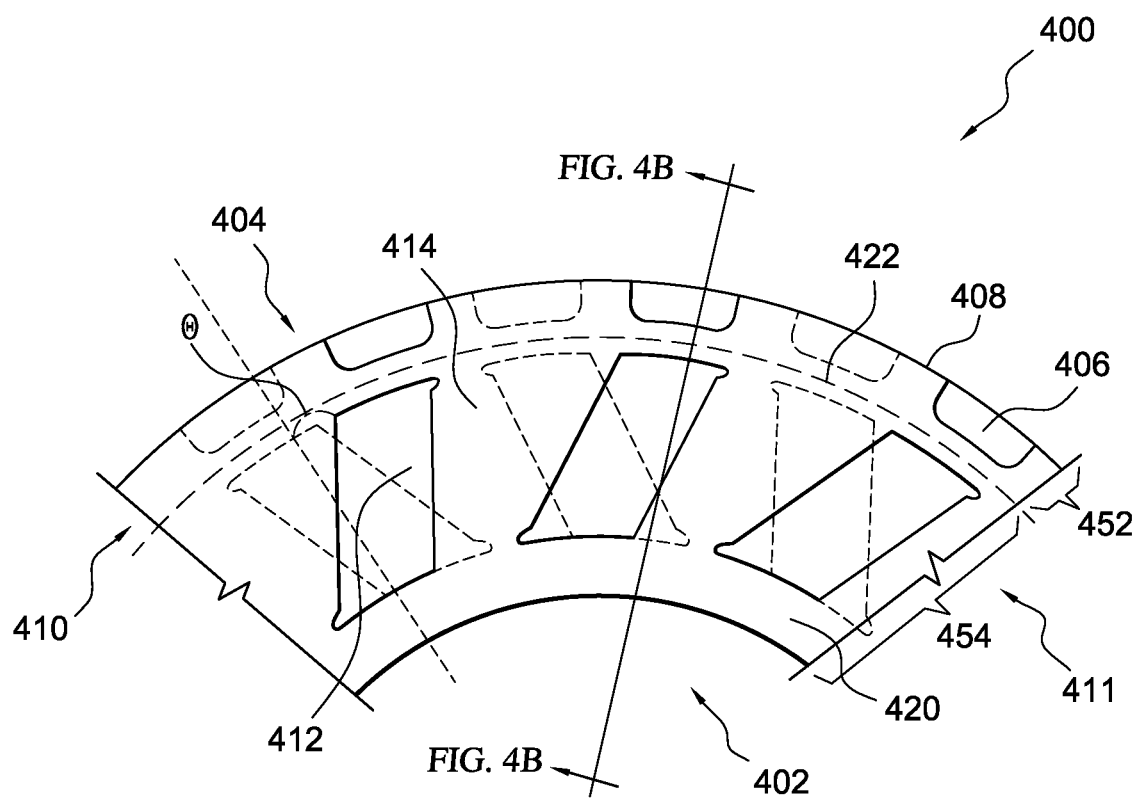
FIG. 4A is a side view of a tire having ribs and cavities that are angled relative to the radial direction in accordance with an embodiment of the present invention.

In those embodiments where the ribs are radially oriented, the cavities preferably are radially oriented as well as shown in FIG. 3A, meaning that the cavities are substantially aligned in a radial direction. The portion of a cavity that is adjacent the inner circumferential member or hoop may be smaller than the portion of the cavity that is adjacent the outer circumferential member or hoop. In this aspect, the sidewalls of the cavity preferably are substantially aligned in the radial direction although other configurations are also possible. In those embodiments where the ribs are oriented at an angle relative to the radial direction, the cavities may similarly be oriented at an angle relative to the radial direction. In various optional embodiments, the cavities may have a substantially triangular, substantially trapezoidal, or substantially parallelogram shape, as shown in FIG. 4A.

As indicated above, the tire preferably includes a central web. The central web preferably is oriented in an imaginary plane (the "radial plane"), which is perpendicular to the axis of rotation (the "central axis") and centrally located relative to the sidewalls of the tire. In one aspect, the tire has an inner circumferential member or hoop and an outer circumferential member or hoop, and the central web connects the inner and outer circumferential members, as well as provides a surface upon which the ribs on adjacent sides of the central web are secured. Thus, the central web conceptually separates the ribs and cavities on one lateral side of the tire from those on the other lateral side of the tire. That is, the central web preferably separates laterally opposing side cavities and laterally opposing ribs. The presence of a central web has been shown to significantly increase tire strength and tire lifetime.

The specific form or design of the tread may vary widely. As indicated above, however, the tread preferably comprises laterally extending tread grooves that are substantially offset relative to the ribs. By being "substantially offset" relative to the ribs it is meant that the laterally extending tread grooves do not substantially overlap radially underlying ribs at the portion, e.g., wall, where the rib meets the outer circumferential member or hoop. Thus, in those embodiments where the ribs, and hence the cavities, are angled relative to the radial direction, a tread groove is considered "offset" with a radially underlying rib when the groove does not substantially overlap the radially underlying rib at the wall where the rib that meets the outer circumferential member or hoop, regardless of the location where the rib connects with the inner circumferential member or hoop.

Additionally or alternatively, the tread may comprise laterally extending tread grooves that are substantially aligned with the cavities. By "substantially aligned" with the ribs it is meant that a laterally extending tread groove is in substantial radial alignment with an underlying cavity in a region where the cavity connects with the outer circumferential member or hoop. Thus, in those embodiments where the ribs are angled relative to the radial direction, a tread groove is considered "substantially aligned" with a cavity if the groove substantially overlaps a radially underlying cavity in a region where the cavity connects with the outer circumferential member or hoop regardless of the location where that cavity connects with the inner circumferential member or hoop. Of course, the tread employed may include other tread features in addition to the aforementioned tread grooves.

Since, in one embodiment, the side cavities are staggered with respect to laterally opposing side cavities and laterally extending tread grooves are substantially offset relative to the ribs (or in substantial radial alignment with the cavities), the number of laterally extending tread grooves generally corresponds with the number of cavities (as well as the number of ribs) in the tire. In some embodiments, there may be one or more tread grooves that each align relative to the cavities. The ratio of the number of cavities to the number of tread grooves preferably ranges from 1:1 to 4:1 or from 1:1 to 2:1. Similarly, the ratio of the number of ribs to tread grooves is preferably ranges from 1:1 to 4:1 or from 1:1 to 2:1.

In this first configuration, where tread grooves are in substantial radial alignment with the cavities and offset relative to the ribs, the shear stress may be reduced. The reduction may be approximately 5% to 50%, e.g. 10% to 30%, as compared to a tire where the grooves are aligned with the ribs on the same sidewall. FEA shows a reduction of stress distribution of approximately 25% as compared to a tire having grooves that are aligned with the ribs and offset relative to the cavities.

In a second embodiment of the present invention, there is a non-pneumatic tire having: (a) an central radial region comprising side cavities that are staggered with respect to laterally opposing side cavities; and (b) an outer radial region comprising laterally extending tread grooves that are substantially offset relative to the cavities. Defined in another manner, in the second embodiment, there is provided a non-pneumatic tire having: (a) an central radial region comprising side ribs (which preferably define the above-described cavities) that are staggered with respect to laterally opposing side ribs; and (b) an outer radial region comprising laterally extending tread grooves that are in substantial radial alignment with the ribs, wherein the central radial region is formed of a first polyurethane material having a Shore A hardness of from 70A to 95A, e.g., from 80A to 90A, or more preferably from 85A to 89A, and the outer radial region is formed of a second polyurethane material having a Shore A/D hardness of from 85A to 60D, e.g., from 90A to 50D, or more preferably from 92A to 95A. As described above with respect to the first embodiment, the ribs and/or cavities of this embodiment may be radially oriented or angled relative to the radial direction. Defined in another manner, in the second embodiment, there is provided a non-pneumatic tire having: (a) an central radial region comprising side ribs (which preferably define the above-described cavities) that are staggered with respect to laterally opposing side ribs; and (b) an outer radial region comprising laterally extending tread grooves that are in substantial radial alignment with the ribs and the tread grooves have at least one wall that is angled with respect to the radial direction, wherein the central radial region is formed of a first polyurethane material having a Shore A hardness of from 70A to 95A, e.g., from 80A to 90A, or more preferably from 85A to 89A, and the outer radial region is formed of a second polyurethane material having a Shore A/D hardness of from 85A to 60D, e.g., from 90A to 50D, or more preferably from 92A to 95A.

In a further embodiment of the present invention, there is provided a non-pneumatic tire having: (a) an central radial region comprising side cavities that are staggered with respect to laterally opposing side cavities; and (b) an outer radial region comprising laterally extending tread grooves that are substantially offset relative to the cavities and the tread grooves have at least one wall that is angled with respect to the radial direction, and wherein the central radial region is formed of a first polyurethane material having a Shore A hardness of from 70A to 95A, e.g., from 80A to 90A, or more preferably from 85A to 89A, and the outer radial region is formed of a second polyurethane material having a Shore A/D hardness of from 85A to 60D, e.g., from 90A to 50D, or more preferably from 92A to 95A. One advantage of the second embodiment is that the non-pneumatic tire may provide a quieter and softer ride.

Optionally, the width of each laterally extending tread groove decreases from the portion of the tread groove adjacent to the sidewall of the tire toward the axial plane, i.e., centerline, of the tire. That is, the tread grooves optionally extend laterally across the width of the tire and open towards one of the sidewalls near the shoulder of the tire. Thus, the tread grooves may take on an acute triangular form, preferably an isosceles triangular form, with the smallest angle of the triangular form pointing toward the radial plane of the tire. In some other aspects, the tread grooves extend across the radial plane of the tire, in which case the smallest angle of the triangular form may point to the opposing sidewall rather than to the radial plane of the tire. Employing acute triangular tread grooves may be particularly desirable for facilitating removal of the tire from its mold during the manufacturing process, described below.

As indicated above, in various embodiments, the tires may include a configuration having: (1) laterally extending tread grooves that are substantially offset relative to the ribs or which are in substantial radial alignment with the cavities, (2) laterally extending tread grooves that are substantially offset relative to the cavities or which are in substantial radial alignment with the ribs, or (3) a hybrid combination of both. In one embodiment the tread grooves may have at least wall that is angled relative to the radial direction. The tread grooves preferably are molded into, e.g., embedded in, the outer circumferential member or hoop so as to provide traction for the tires. The tread grooves preferably extend from the sidewalls of the tire inwardly toward the radial plane of the tire. Thus, in some aspects, the tire includes two sets of tread grooves: one set substantially oriented on a first lateral side of the radial plane of the tire and a second set substantially oriented on a second lateral side of the radial plane of the tire. It is also contemplated, as indicated above, that some or all of the tread grooves may extend (optionally slightly extend) across the radial plane of the tire to the other lateral side of the tire. Thus, in some embodiments, no portion of either set of tread grooves overlaps in a circumferential direction with tread grooves from the other set of tread grooves. In other embodiments, at least some portion of the tread grooves from one set of tread grooves overlaps in a circumferential direction with tread grooves from the second set of tread grooves, and vice versa.

As indicated above, in one embodiment, the cavities in each sidewall are substantially staggered or offset relative to cavities on the opposing sidewall. A central web preferably separates the cavities of each sidewall from the cavities on the opposing sidewall. The cavities preferably extend substantially perpendicularly relative to a plane of the sidewall from the sidewall (e.g., preferably extend in a substantially lateral direction) toward the central web, i.e., toward the axial plane. In another aspect, the cavities extend toward the central web from the sidewall at an angle relative to the lateral direction.

In this latter aspect, in order to facilitate mold removal during tire manufacture, the cross-sectional area of each cavity preferably decreases in a direction from the sidewall toward the central web. In one embodiment, the substantially staggered cavities are such that the geometric centers of laterally opposing cavities on opposite sidewalls are not coincident with each other.

As indicated above, the tire has a plurality of ribs that separate cavities and extend between the inner circumferential member or hoop and the outer circumferential member or hoop. The inner circumferential member or hoop is preferably mountable on a rim and the outer circumferential member or hoop includes the tire tread (which includes the tread grooves) on the outer surface thereof. It should be understood that the inner circumferential member or hoop and the outer circumferential member or hoop comprise an unitary structure that is integrally formed from the same material.

The above-described tire configurations of the embodiments are particularly suited for tires having a rim with a diameter of at least 80 inches (203 cm), e.g., at least 110 inches (279 cm), or at least 140 inches (356 cm), such as tires used for off-the-road (OTR) vehicles, although the tires may also be employed on rims with smaller diameters. In the embodiment where the ribs are staggered with respect to laterally opposing ribs and the opposing side cavities are separated by a central web there is a beneficial relationship between the ribs and the central web. The synergy between the cavities, ribs and grooves increases the buckling deflection, thus allowing the part of the tire to deflect more and carry more load than would otherwise be expected. In some embodiments, the tires may be capable of supporting OTR vehicles with operational weights as high as 380 to 460 tons. An additional benefit is that the increased tire strength may allow for a reduction in the amount of tire material for a given load, which reduces the tire weight and maximizes material efficiency. Further, the improved strength in the tires preferably provides increased tire lifetime relative to conventional pneumatic and non-pneumatic tires. In one embodiment the width of the central web is less than the width of each rib.

The tires of the present invention preferably are non-pneumatic, meaning that the tires are made of a solid material that does not require inflation to be operational. Non-pneumatic tires do not have the risks associated with tire failures, blow-outs, or punctures associated with pneumatic tires. An additional benefit of non-pneumatic tires is that even in the event of a tire failure, the tire may be driven on so that the vehicle, e.g., OTR vehicle, can be moved to a maintenance facility without requiring expensive or time-consuming towing.

Radial regions of differing hardness may be formed from elastomeric materials. Preferably, the elastomeric material is the reaction product of an isocyanate, polyol, and a curative, and not a blowing agent, e.g., the elastomeric material is a non-foamed polyurethane material. In one embodiment, the elastomeric material for the outer radial region is different than the elastomeric material of the inner radial regions. Suitable materials for each radial region of the non-pneumatic tires include elastomeric materials, such as those described in U.S. Pat. No. 4,832,098, U.S. Pat. No. 4,934,425, U.S. Pat. No. 4,921,029, U.S. Pat. No. 4,784,201, U.S. Pat. No. 5,605,657, and U.S. application Ser. No. 09/919,994, filed on Aug. 2, 2001, the entire contents and disclosure of which are hereby incorporated by reference. One exemplary material may be a polyurethane elastomer comprising a prepolymer formed from a diisocyanate, e.g., diphenylmethane diisocyanate (MDI), toluene diisocyanate (TDI), para-phenylene diisocyanate (PPDI), 1,6-hexane diisocyanate (HDI), isophorone diisocyanate (IPDI), 3,3'-bitoluene diisocyanate (TODI), 1,4-cyclohexyl diisocyanate (CHDI), naphthalene-1,5-diisocyanate (NDI), methylene bis(p-cyclohexyl isocyanate) ($H_{12}$MDI), etc., and a polyol, e.g. polycaprolactone, polyester, poly(adipate)glycol, poly(hexamethylene adipate) glycol, poly(ethylene adipate)glycol, poly(diethylene adipate)glycol, poly(ethylene/propylene adipate)glycol, poly(oxypropylene)-poly(oxyethylene)glycol, poly(trimethylolpropane/hexamethylene adipate)glycol, poly(ethylene/butylene adipate)glycol, poly(butylene adipate) glycol, poly(hexamethylene/neopentyl adipate)glycol, poly(butylene/hexamethylene adipate)glycol (PBHAG), poly(neopentyl adipate)glycol, poly(tetramethylene ether)glycol (PTMEG), polyether, polyalkyleneether polyols, etc., that is cured with a polyol or diamine curative such as 4,4'-methylene-bis(2-chloroaniline) (MBCA); 4,4'-methylene-bis(3-chloro-2,6-diethylaniline) (MCDEA); diethyl toluene diamine (DETDA; Ethacure™ 100 from Albemarle Corporation); tertiary butyl toluene diamine (TBTDA); dimethylthio-toluene diamine (Ethacure™ 300 from Albemarle Corporation); trimethylene glycol di-p-amino-benzoate (Vibracure™ A157 from Chemtura Company, Inc. or Versalink™ 740M from Air Products and Chemicals); methylene bis orthochloroaniline (MOCA), methylene bis diethylanaline (MDEA); methylenedianiline (MDA); MDA-sodium chloride complex (Caytur™ 21 and 31 from Chemtura Company); isobutyl 3,5-diamino-4-chlorobenzoate (Baytec™ 1604 from Bayer MaterialScience), ethylene glycol, diethylene glycol, dipropylene glycol, neopentyl glycol, 1,3-butanediol, 1,4-butanediol, hydroquinone-bis-hydroxyethyl ether (HQEE), cyclohexyldimethanol (CHDM), etc. Preferably the prepolymer mixture has a low free diisocyanate content from 0.1 wt % to 7.0 wt %, e.g., from 1.0 wt % to 5.0 wt % or 2.5 to 3.5 wt %, based on the total weight of the prepolymer mixture. Exemplary elastomeric materials suitable for non-pneumatic tires include polyurethanes such as those formed from commercially available Adiprene™ polyurethane prepolymers and Caytur™ diamine curatives from Chemtura Corp., a segmented copolyester such as Hytrel 5556 from DuPont, a reaction injection molded material, and a block copolymer of nylon such as Nyrim from Monsanto Chemical Co. In this disclosure, polyurethane refers to polymer with urethane linkages (derived from an isocyanate group and a hydroxyl group) and optionally, urea linkages as well (derived from an isocyanate group and an amine group). Examples of such polyurethane elastomers are disclosed in U.S. Pat. Nos. 5,077,371, 5,703,193, and 6,723,771, and U.S. application Ser. No. 11/702,787, filed on Feb. 5, 2007, the entire contents and disclosure of which are hereby incorporated by reference.

In one preferred embodiment, the elastomeric material comprises a temperature de-blocked polyurethane elastomer. Such polyurethane elastomers may comprise a mixture of a polyurethane prepolymer formed from a polyol, e.g. polycaprolactone, poly(adipate)glycol, PBHAG, PTMEG, etc., and a MDI or NDI, preferably having a low free MDI or NDI content from 0.1% to 7.0%, e.g., from 1.0% to 5.0% based on the total weight of the prepolymer mixture, and a curative having a low free MDA content from 0.05% to 2.0%, e.g. from 0.1% to 1.0% based on the total weight of the curative. Such preferred polyurethane systems are disclosed in US Publication No. 2003/0065124, the entirety of which is incorporated herein by reference. A suitable low free MDI polyurethane prepolymer includes ADIPRENE™ LFM 2450, ADIPRENE™ LFM 2400, ADIPRENE™ LFM 1350, ADIPRENE™ LFM 1250, ADIPRENE™ LFM 500, and Vibrathane™ 8030 each made by Chemtura Corporation. A suitable low free MDA curative includes Caytur™ 21, Caytur™ 21-DA, Caytur™ 31, Caytur™ 31-DA each made by Chemtura Corporation.

In one embodiment, each radial region is made of an elastomeric material formed from the reaction product of low free MDI, polycaprolactone, and Caytur™ 31-DA. In another embodiment, each radial region is made of an elastomeric material formed from the reaction product of low free MDI, poly(adipate)glycol, and Caytur™ 31-DA. In another embodiment, each radial region is made of an elastomeric material formed from the reaction product of NDI, polycaprolactone, and 1,4-butanediol. In another embodiment, each radial region is made of an elastomeric material formed from the reaction product of NDI, poly(adipate)glycol, and 1,4-butanediol. In another embodiment, each radial region is made of an elastomeric material formed from the reaction product of NDI, polycaprolactone, and HQEE. In another embodiment, each radial region is made of an elastomeric material formed from the reaction product of NDI, poly(adipate)glycol, and HQEE. In alternative embodiments, radial regions may be formed from two or more of these preferred polyurethane reaction products.

Exemplary combinations of materials, as well as hardness for outer/central/inner radial regions are shown in Table 1.

center axis of exemplary tire 300. Tire 300 is mountable to a rim, not shown, which would be in central region 302.

In embodiments of the present invention, tire 300 is preferably removably mountable to a rim in central region 302. In one embodiment, tire 300 is molded onto or adhered with an adhesive or bonding agent to a mounting ring, e.g., a metal mounting ring, which may slideably engage the rim. Suitable mounting rings include those described in co-pending U.S. Ser. No. 12/036,964, entitled "Tire and Tire Rim Assembly," filed Feb. 25, 2008, the entire contents and disclosure of which is hereby incorporated by reference. In one embodiment, tire 300 is molded onto or adhered to the rim, without using a mounting ring. In another embodiment, tire 300 is pressed onto the rim which creates an interference fit when mounted such that the friction between the tire and rim holds the tire in place. In one embodiment, the interference fit may be created by heating the rim and band using torches or gas ovens and assembling into position while in their hot, expanded, freely sliding state. While cooling both parts are contracted back to their former size, except for the compression that results from the rim interfering with the band. In another embodiment, the band of the tire is pressed on to the rim using a press or jack to create the interference fit. It should be understood to those skilled in the art that tire 300 may be

TABLE 1

| | Outer Radial Region | | Central Radial Region | | Inner Radial Region | |
|---|---|---|---|---|---|---|
| | PU mixture | Hardness | PU mixture | Hardness | PU mixture | Hardness |
| a. | MDI<br>PBHAG<br>MDA* | 93A | MDI<br>PBHAG<br>MDA* | 88A | | |
| b. | MDI<br>polycaprolactone<br>MDA* | 95A | MDI<br>Polycaprolactone<br>MDA* | 85A | | |
| c. | MDI<br>PBHAG<br>1,4 Butanediol | 95A | NDI<br>PBHAG<br>1,4 Butanediol | 85A | | |
| d. | MDI<br>polycaprolactone<br>1,4 Butanediol | 95A | MDI<br>polycaprolactone<br>HQEE | 88A | | |
| e. | MDI<br>PBHAG<br>HQEE | 95A | MDI<br>PBHAG<br>HQEE | 85A | | |
| f. | NDI<br>polycaprolactone<br>HQEE | 95A | NDI<br>polycaprolactone<br>HQEE | 86A | | |
| g. | PPDI<br>PBHAG<br>1,4 Butanediol | 95A | PPDI<br>PBHAG<br>1,4 Butanediol | 88A | | |
| h. | NDI<br>PBHAG<br>1,4 Butanediol | 93A | NDI<br>polycaprolactone<br>1,4 Butanediol | 88A | NDI<br>PBHAG<br>1,4 Butanediol | 65A |
| i | TDI<br>PBHAG<br>MBCA | 60D | TDI<br>PBHAG<br>MBCA | 85A | TDI<br>PBHAG<br>MBCA | 70A |
| j | MDI<br>Polycaprolactone<br>MDA* | 60D | MDI<br>Polycaprolactone<br>MDA* | 88A | MDI<br>PTMEG<br>MDA* | 85A |

*Caytur ™ 31DA

Also in one embodiment, the tire is formed only of elastomeric materials described above and lacks a metal component, such as a metal band, metal wire, or metal reinforcement, and/or lacks a rubber component, such as a rubber tread.

Figure 3B:
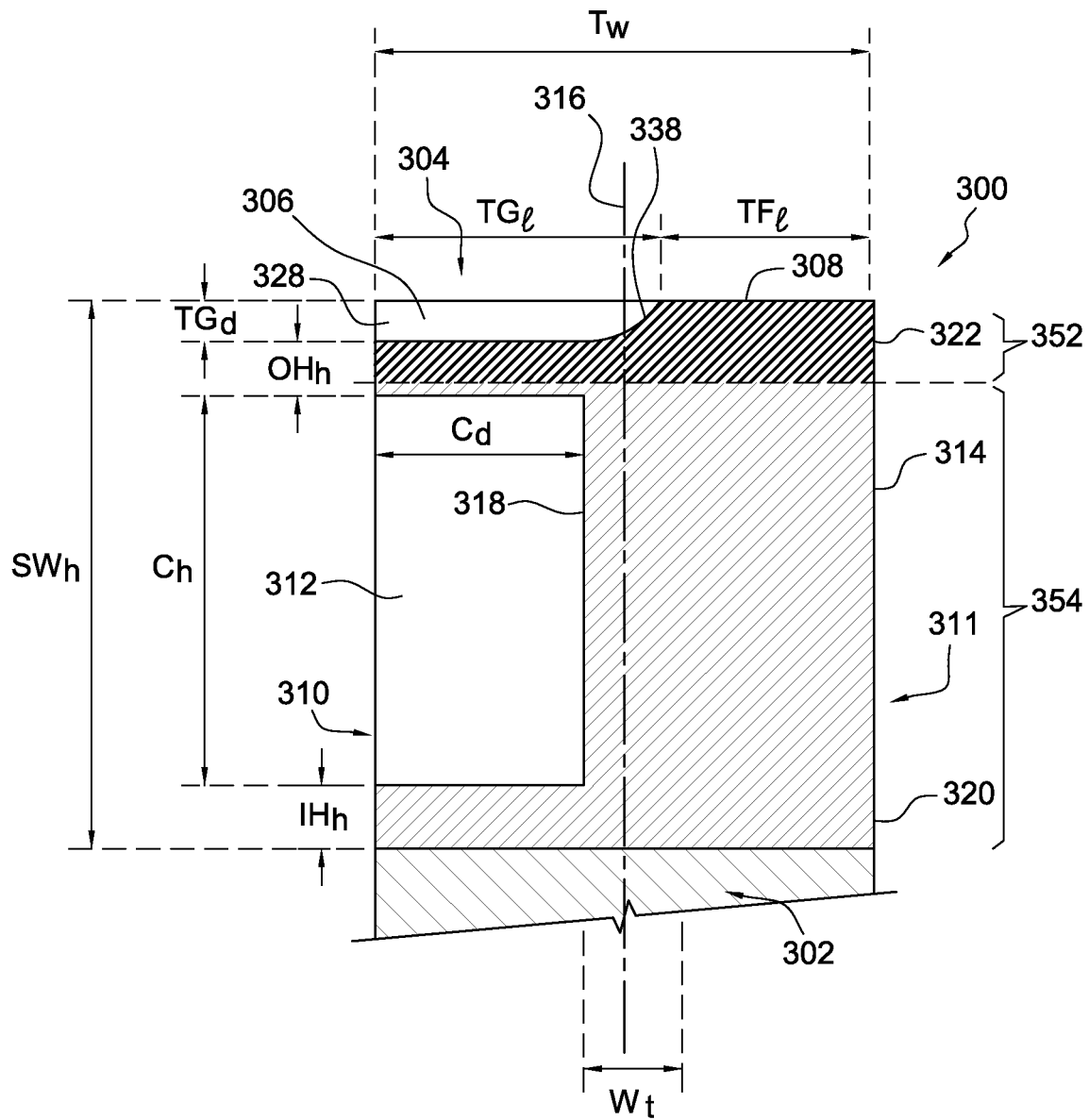
FIG. 3B is a cross-sectional view the tire in FIG. 3A.
Figure 3C:
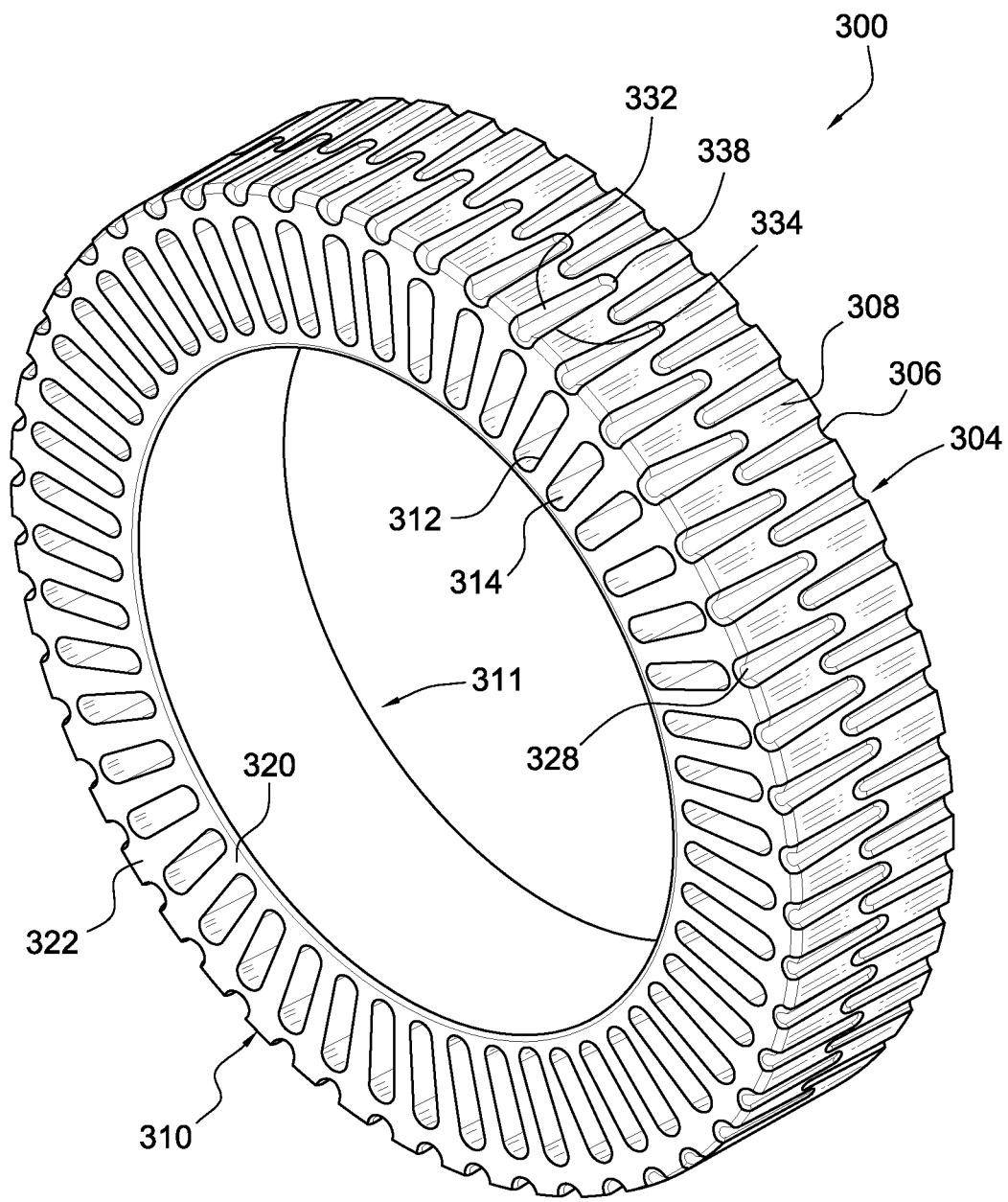
FIG. 3C is a perspective view of the tire in FIG. 3A.

Non-limiting FIGS. 3A, 3B and 3C illustrate a tire 300 having an outer radial region 352 and an central radial region 354, according to one embodiment of the present invention. As shown, cavities 312 extend in a radial direction from the mounted to rim using a variety of other methods without departing from the scope of the present invention.

Tire 300 comprises a tread pattern 304 having a plurality of tread grooves 306 and tread footprints 308 in a first configuration as discussed above. It should be understood that in other embodiments, tire 300 may comprise the second or third configurations as discussed above. Tread footprint 308 is the portion of tread pattern 304 that is in contact with the ground or other similar surface. It should be readily understood that tire pattern 304 is continuous around the outer circumference of tire 300, although the opposite sides of tire 300 preferably include separate sets of tread grooves, which are substantially offset with respect to one another, as described above. Tire 300 also comprises two sidewalls 310, 311, each having a plurality of staggered cavities 312 separated by ribs 314. Cavities 312 extend from a plane perpendicular to sidewalls 310, 311 towards radial plane or centerline 316. Oriented about radial plane 316 is central web 318. Cavities 312 are separated from the rim region 302 by inner circumferential member or hoop 320 and from tread pattern 304 by outer circumferential member or hoop 322. Cavities 312, ribs 314, central web 318 and tread grooves 306 are molded in the same mold and are structurally integrated. Tire 100 lacks a metal band or reinforcement member.

Tread grooves 306, tread footprints 308 and a portion of the outer circumferential member 322 comprise outer radial region 352. Outer radial region 352 has a Shore A/D hardness of from 85A-60D, e.g., from 90A-50D, or more preferably from 92A to 95A. Cavities 312, ribs 314, central web 318, inner circumferential member 320 and a portion of the outer circumferential member 322 comprise central radial region 354. Central radial region 354 has a Shore A hardness of from 70A to 95A, e.g., from 80A to 90A, or more preferably from 85A to 89A. In the exemplary embodiment shown in FIG. 3A, the boundary between outer radial region 352 and central radial region 354 occurs within outer circumferential member 322.

Tread grooves 306 comprise a base 330, first wall 332 and second wall 334. First wall 332 and second wall 334 are joined by a closed wall 338, shown in FIGS. 3B and 3C. As shown in FIG. 3A, first wall 332 and second wall 334 are aligned in a radial direction and are not substantially angled with respect to the radial direction. In such embodiments, when base 330 is parallel to the ground, first wall 332 and second wall 334 are substantially perpendicular to the ground. In other words, first wall 332 and second wall 334 are substantially straight and are substantially parallel to each other, i.e., U-shaped.

As shown, each tread groove 306 extends laterally across a portion of the width of tire 300 and opens near the shoulder region of where tread pattern 304 adjoins each sidewall 310, 311. In the first configuration, tread grooves 306 are substantially offset relative to the ribs 314, but are in substantial radial alignment with, e.g., radially overlap, cavities 312 that are on the same sidewall 310 thereof. Tread grooves 306 alternate along tread pattern 304 as shown in FIG. 3C. As shown, tread grooves 306 extend in from the shoulder of tire 300 without bending or angling relative to the lateral direction as shown in FIG. 3C.

As shown in FIG. 3A, cavities 312 and ribs 314 extend in a radial direction from a center axis of tire 300. As used herein radially or radial refers to being in line with a direction that extends from the center axis of tire 300. As shown, radial cavities 312 have a substantially oval or trapezoidal shape with the distance between ribs 314 closest to rim 302 is less than the distance between the same ribs 314 closest to tread pattern 304 although other geometries may employed, as discussed above.

In the embodiment shown in FIG. 3B, each cavity 312 is defined by the inner circumferential member or hoop 320, an outer circumferential member or hoop 322 and adjacent ribs 314. As shown, staggered cavities 312 extend inward perpendicularly from a plane of sidewall 310 with substantially straight walls such that the open area of cavity 312 is approximate to the area of the cavity on web 318. In other embodiments, the walls of the cavities may be angled or designed with a draft, in which case the cross-sectional area of rib at the sidewall would be less than the cross sectional area of rib where it meets the central web. This latter embodiment may be desirable to facilitate removal of the tire from the mold during manufacturing as discussed above.

The staggered cavities 312 on sidewalls 310, 311 extend into tire 300 towards central web 318. On sidewall 311, cavities 312 are staggered or offset relative to cavities 312 on the other side of the central web 318, such that ribs 314 on sidewall 310 laterally align with cavities 312 on opposing sidewall 311, and vice versa. Such staggering of cavities 312 reduces the amount of material used in the mold when making a tire of the present invention while maintaining desirable strength, durability and lifetime characteristics for the tire. The configuration of cavities 312, ribs 314, and grooves 306 act together to strengthen central web 318 and the overall tire 300.

In the embodiment of FIGS. 3A-3C, cavities 312 and tread grooves 306 are radially aligned relative to each other and create a pattern as follows. On one sidewall 310, ribs 314 are in substantial radial alignment with corresponding footprints 308, while on the opposing sidewall 311 a cavity 312 is in substantial radial alignment with tread groove 306. This alternating pattern between tread pattern 304 and sidewalls 310, 311 repeats for the entire circumference of tire 300.

The number of cavities 312, ribs 314 and grooves 306 may vary depending on the configuration of tire 300. The tire may have, for example, from 10 to 80 cavities, or more preferably from 25 to 60 cavities on each sidewall (twice as many in the overall tire). The tire may similarly have, for example, from 10 to 80 ribs, or more preferably from 25 to 60 ribs on each sidewall (twice as many in the overall tire). The tire optionally may also have from 0 to 320 tread grooves, or more preferably 40 to 120 tread grooves on each side of the tire (twice as many in the overall tire). Embodiments with zero grooves may be referred to as slick tires which lack a tread pattern. In one embodiment a tire has the same number of cavities, ribs and grooves.

The dimensions of tire 300 may be affected by various design parameters such as ground pressure (traction), vertical spring rate (ride), cornering power (handling), total deflection, material volume, and tire weight. As shown by FIGS. 3A and 3B tire 300 may have the dimensions provided in Table 2.

TABLE 2

| | | Dimensions of Tire | | |
|---|---|---|---|---|
| Item | Description | General Range | Preferred Range | Most Preferred Range |
| $T_w$ | Tire Width | 13-178 cm (5-70 inches) | 51-150 cm (20-59 inches) | 66-74 cm (26 to 29 inches) |
| $SW_h$ | Sidewall Height | 5-279 cm (2-110 inches) | 13-203 cm (5-80 inches) | 38-127 cm (15-50 inches) |
| $C_d$ | Cavity Depth | 13-76 cm (5-30 inches) | 20-38 cm (8-15 inches) | 25-33 cm (10-13 inches) |

TABLE 2-continued

Dimensions of Tire

| Item | Description | General Range | Preferred Range | Most Preferred Range |
|---|---|---|---|---|
| $C_h$ | Cavity Height | 13-295 cm (5-116 inches) | 20-76 cm (8-30 inches) | 25-64 cm (10-25 inches) |
| $C_w$ | Cavity Width | 2-38 cm (1-15 inches) | 5-33 cm (2-13 inches) | 5-20 cm (2-8 inches) |
| $W_t$ | Web Thickness | 1-51 cm (0.5-20 inches) | 2-20 cm (1-8 inches) | 4-10 cm (1.5-4 inches) |
| $IH_h$ | Inner Hoop Height | 1-102 cm (0.5-40 inches) | 2-20 cm (1-8 inches) | 5-10 cm (2-4 inches) |
| $OH_h$ | Outer Hoop Height | 1-102 cm (0.5-40 inches) | 2-25 cm (1-10 inches) | 5-20 cm (2-8 inches) |
| $TG_d$ | Tread Groove Depth | 1-30 cm (0.25-12 inches) | 5-20 cm (2-8 inches) | 6-15 cm (2.5-6 inches) |
| $TG_l$ | Tread Groove Length | 1-76 cm (0.25-30 inches) | 2-64 cm (1-25 inches) | 10-51 cm (4-20 inches) |
| $TF_l$ | Tread Footprint Length | 1-102 cm (0.25-40 inches) | 2-76 cm (1-30 inches) | 10-51 cm (4-20 inches) |
| $TG_{w1}$ | Tread Groove Width (at tread surface) | 2-38 cm (1-15 inches) | 8-33 cm (3-13 inches) | 10-20 cm (4-8 inches) |
| $TG_{w2}$ | Tread Groove Width (at tread base) | 0.5-32 cm (0.2-12.5 inches) | 2-25 cm (0.8-10 inches) | 4-20 cm (1.6-8 inches) |
| $R_t$ | Rib Thickness | 2-38 cm (1-15 inches) | 5-33 cm (2-13 inches) | 10-20 cm (4-8 inches) |

For some dimensions, the ranges above represent a maximum, such as the $C_w$ and $R_t$, because cavities 312 and ribs 314 may narrow from outer hoop 322 to inner hoop 320. Also $TG_{w1}$ and $TG_{w2}$ may narrow as tread groove 304 approaches closed wall 338. Further, $TG_d$ may decrease as tread groove 304 approaches closed wall 338. It should be understood that $SW_h$ may be equal to $C_h+IH_h+OH_h+TG_d$, and $T_w$ is equal to $2(C_d)+W_t$ and may be also equal to $TG_l+TF_l$.

In one embodiment, outer radial region may have a height that is substantially equal to the combined height of the $TG_d$ and $OH_h$. Preferably, the outer radial region has a height that is greater than $TG_d$. For example, outer radial region may have a height of 3.5-130 cm, e.g. from 10-90 cm, or from 15-70 cm. Also center radial region may have a height that is at least equal or greater than to the combined height of the $IH_h$ and $C_h$. For example, central radial region may have a height of 16-295 cm, e.g. from 25-140 cm, or from 30-90 cm.

In one embodiment, an outer radial region may have a height that is approximately from 5-45%, e.g., 5-35% or from 10-25%, of the tire's sidewall height. Preferably a central radial region may have a height that is approximately from 40-95%, e.g., 65-95% or from 75-90%, of the tire's sidewall height. For example, when the tire sidewall height is from 13-203 cm, the outer radial region may be from 0.7 to 91 cm, e.g. from 0.7 to 71 cm, or from 1.3 to 50 cm, while the central radial region may be form 7 to 193 cm, e.g. from 8.5 to 193 cm, or from 10 to 180 cm. When present, any additional inner radial regions may have an height that is approximately 5-55%, e.g., 5-45% or from 10-25%, of the tire's sidewall height. Further, the innermost radial region may have a height that is less than the $IH_h$, such that the innermost radial region does not extend into the cavity portion of the tire.

In one embodiment, $OH_h$ is from 1.5-6 times larger, e.g., from 2-4 times larger or from 2.5-3.5 times larger, than $IH_h$. In still another embodiment, $OH_h+TG_d$ is from 1.5-6 times larger, e.g., from 2-4 times larger or from 2.5-3.5 times larger, than $IH_h$. In such embodiments, the tires will have a thicker portion of the tire near the tread than near the rim, which may increase the operational lifetime of the tire. This allows for the wearing of the tread portion of the tire without wearing the cavity/rib portion of the tire.

In addition to the dimensions represented in Table 1, tire 300 has an outer diameter that may range from 25 inches (64 cm) to 190 inches (483 cm), e.g., from 60 inches (152 cm) to 159 inches (404 cm) or from 63 inches (160 cm) to 100 inches (254 cm). An inner diameter that may range from 20 inches (51 cm) to 140 inches (356 cm), e.g., from 30 inches (76 cm) to 110 inches (279 cm) or from 40 inches (102 cm) to 80 inches (203 cm). It should be understood that unless indicated otherwise, the tire of various embodiments of the present invention used on the same vehicle have similar dimensions.

The tire assembly of the present invention may support 9,000 kg to 91,000 kg per tire (about 20,000 lbs to 200,000 lbs per tire), e.g., 18,000 kg to 68,000 kg per tire or 27,200 kg to 45,400 kg per tire. Also, such tires may support such weights when the vehicle is traveling of speeds in the range from 0 to 100 km/hr (about 0 to 60 mph), e.g., 5 to 65 km/hr or 30 to 50 km/hr. Also, such tires may have an operational lifetime, e.g., tire life, for mining conditions of at least 500 hours, e.g., at least 750 hours or at least 1,000 hours. Tires with such operational lifetimes are particularly beneficial for OTR mining vehicles.

Figure 4B:
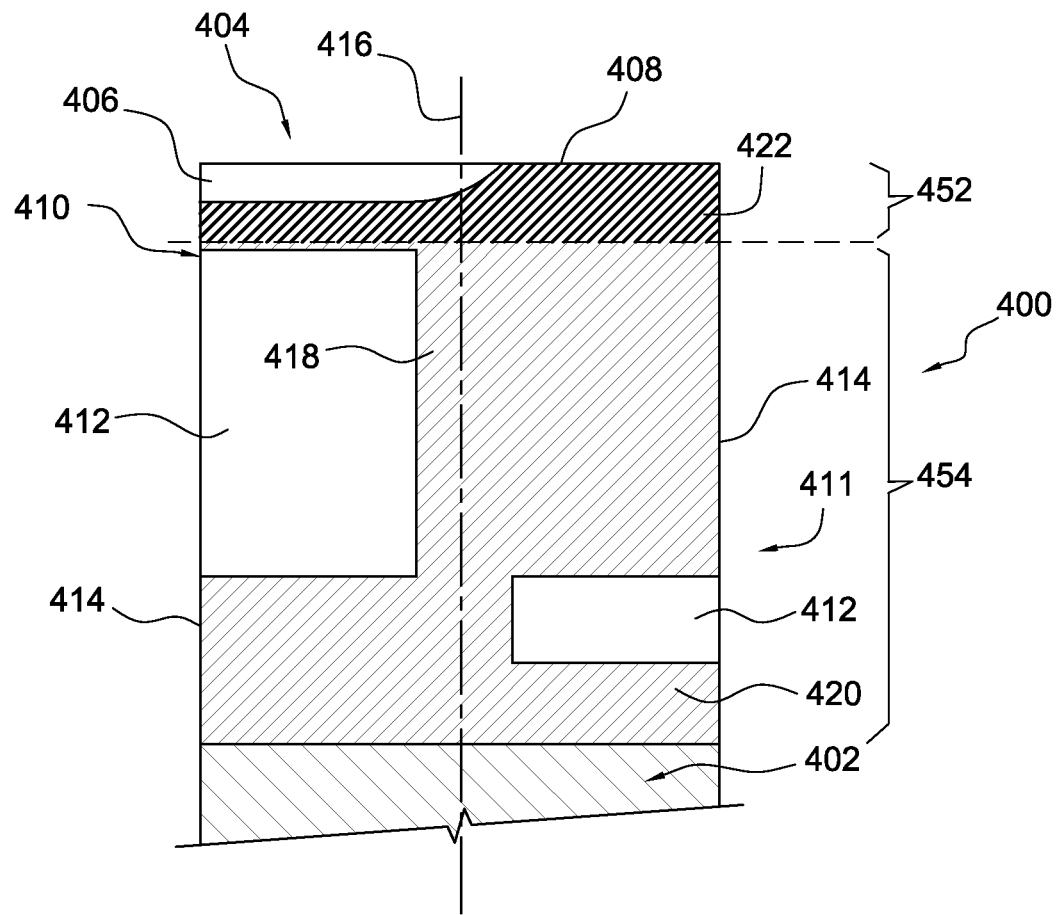
FIG. 4B is a cross-sectional view of the tire in FIG. 4A.

In another embodiment of the present invention, an exemplary tire 400 has regions, outer radial region 452 and central radial region 454, and also has staggered cavities are angled relative to the radial direction as shown FIGS. 4A and 4B. Similar to FIGS. 3A-3C, tire 400 comprises a rim 402 (not shown), tread pattern 404, tread grooves 406, tread footprints 408, sidewalls 410, 411, cavities 412, ribs 414, web 418, inner circumferential member or hoop 420 and outer circumferential member or hoop 422. Outer radial region 452 includes tread grooves 406. Web 418 extends along a radial plane or centerline 416 of tire 400 and separates cavities 412 on each sidewall 410, 411. Central radial region 454 includes web 418. Unlike cavities 412 in FIGS. 3A-3C, cavities 412 in FIGS. 4A and 4B are offset from the radial direction by angle θ, as described above. Changing angle θ with respect to the radial direction effectively varies the spring rate of tire 400.

In FIG. 4A cavities 412 on each sidewall 410, 411 are positioned in the opposite offset direction as shown in U.S. Pat. No. 4,832,098, U.S. Pat. No. 4,934,425, U.S. Pat. No. 4,921,029, and U.S. Pat. No. 4,784,201, the entire contents and disclosure of which are hereby incorporated by reference.

As discussed above, for purposes of the present specification, ribs 414 that are angled relative to the radial direction are considered to be in substantial radial alignment with tread grooves 406 if the ribs are radially aligned with tread grooves at the position where the ribs adjoin outer circumferential member 422. As shown, at the position where rib 414 adjoins outer circumferential member or hoop 422, there is a tread groove 406, and ribs 414 of tire 400 are considered to be in substantial radial alignment with tread grooves 406. On the opposing sidewall 411 at this position, rib 414 would be laterally aligned with an opposing cavity 412. Conversely, on opposing sidewall 411, cavity 412 would be aligned relative to groove where cavity 412 adjoins outer circumferential member of hoop 422. This configuration repeats throughout the circumference of the tire. In another aspect, not shown, the angled ribs may be substantially offset relative to the tread grooves (e.g., the cavities may be in substantial radial alignment with the tread grooves).

In one embodiment, the tire is solid and has a unitary, i.e., integral, structure that comprises a tire and tread formed together and made of the same composition. A unitary structure is configured so that the web and rib structures provide a load-carrying structure with substantially uniform deformation due to compression of the tire as the tire rotates during operation. The thickness of the web, the ribs and the hoops are such that there is substantially no sidewall bulge of the tire during operation. In addition, the tire may deform without buckling, due to compression during normal operation, but the tire is configured to allow the ribs to buckle, either individually or severally, when the tire runs over a projection on the ground. The word "buckle" as used herein is defined as a relatively sudden and radical deformation as a result of compression loading that exceeds a certain critical load value. In addition, the tires of the present invention, particularly those having radially oriented ribs, tend to exhibit improved envelopment of road hazards relative to conventional solid non-pneumatic tires due to this buckling behavior resulting in reduced impact forces on the vehicle.

The ability of tires configured in accordance with some embodiments of the present invention to be deformed yet return to its cylindrical shape substantially instantaneously under compression and sudden transitions of loading requires that the tires withstand a maximum strain of from 10% to 30%, e.g., from 15% to 20%, during normal operation yet buckle locally to absorb the sudden impact of a projecting object, or ground surface irregularity. It is this unexpected ability, derived from its unique construction from the elastomer, which gives such tires the handling and ride characteristics suitable for OTR vehicles.

Figure 5A:
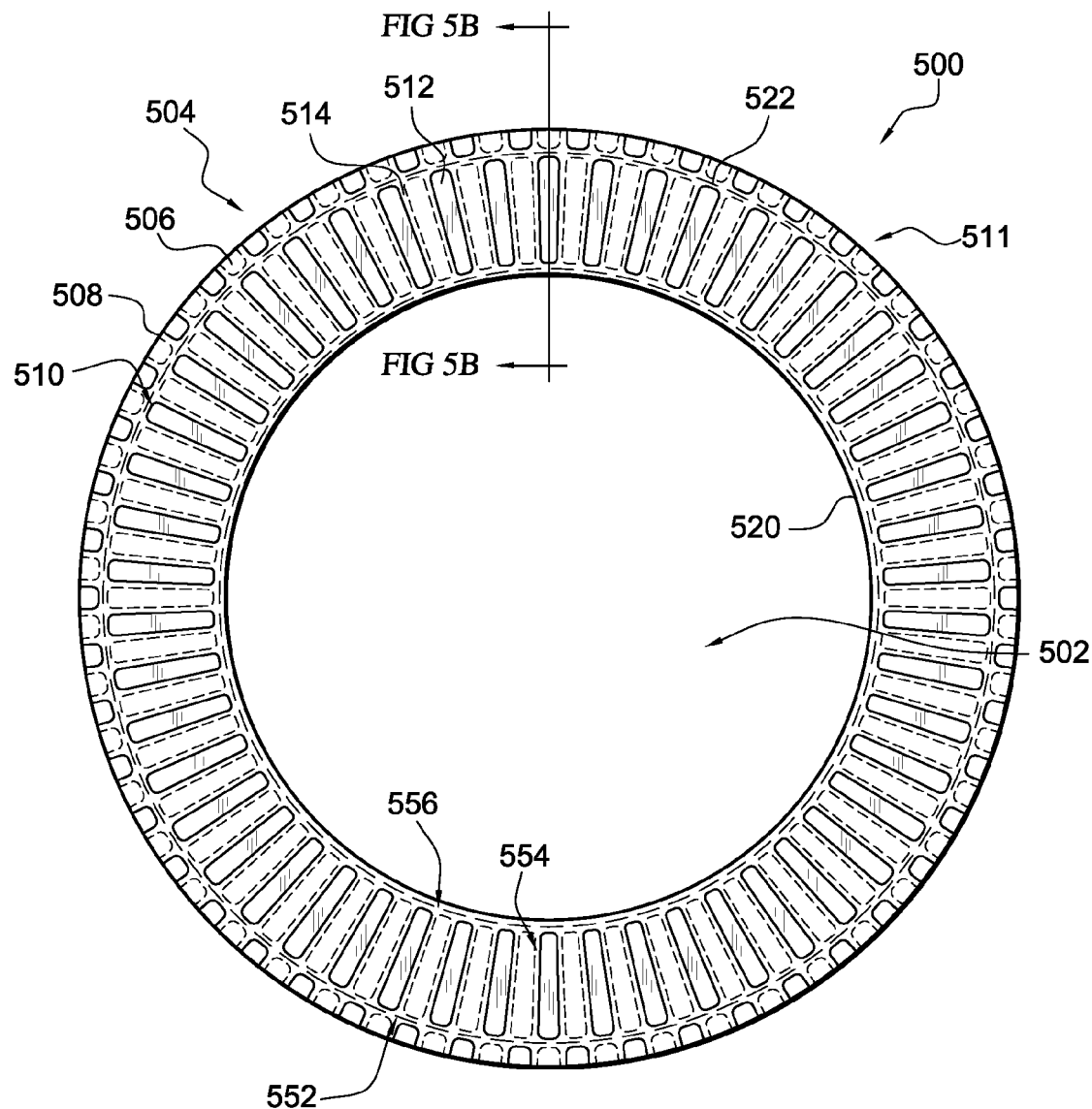
FIG. 5A is a side view of a tire having laterally extending tread grooves that are in substantial radial alignment with the ribs in accordance with an embodiment of the present invention.
Figure 5B:
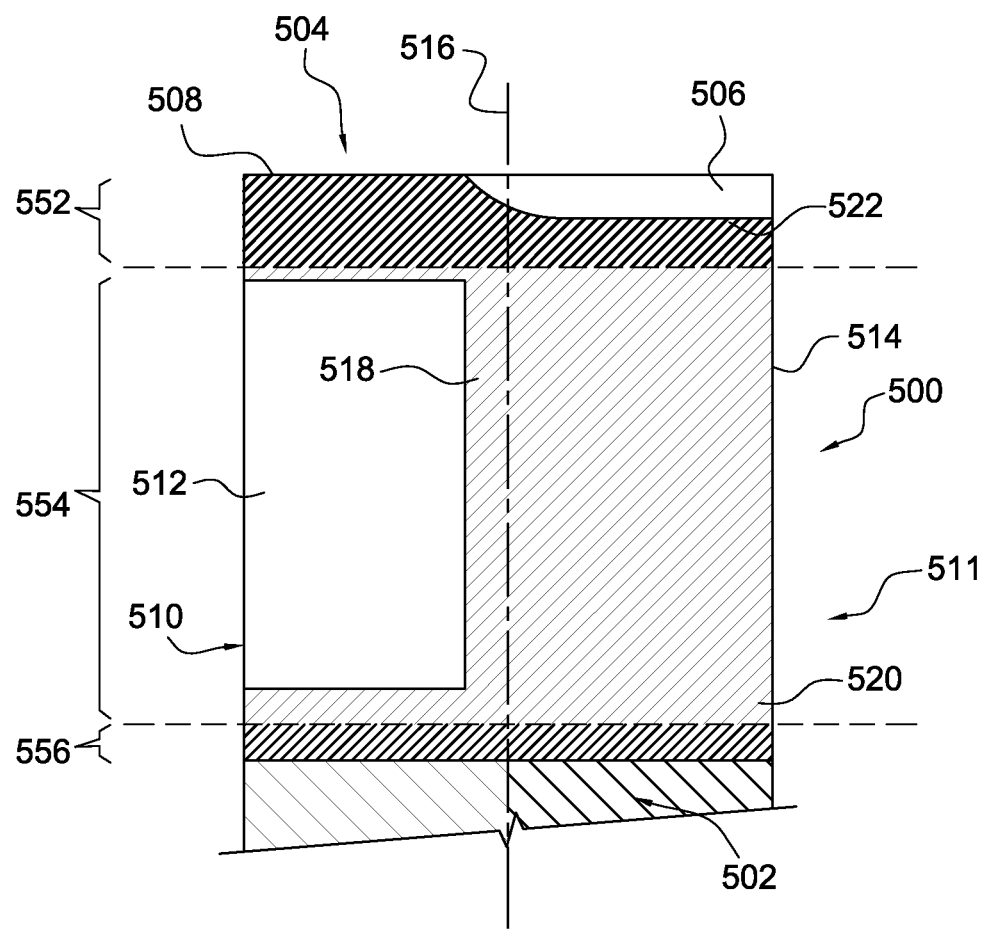
FIG. 5B is a cross-sectional view the tire in FIG. 5A.

Non-limiting FIGS. 5A, and 5B illustrate an exemplary tire 500 having an outer radial region 552 and central radial region 554 and an inner radial region 556, according to the second embodiment of the present invention. Tire 500 comprises a central region 502, tread pattern 504, tread grooves 506, tread footprints 508, sidewalls 510, 511, cavities 512, ribs 514, central web 518 oriented about radial plane or centerline 516, inner circumferential member or hoop 520, and outer circumferential member or hoop 522. Outer radial region 552 includes tread grooves 506, while central radial region 554 includes web 518. Inner radial region 556 includes inner circumferential member 520. Cavities 512 and tread grooves 506 are radially offset relative to each other in the second configuration and create a pattern as follows. On one sidewall 510, ribs 514 are in substantial radial alignment with corresponding grooves 506, while on the opposing sidewall 511, cavity 512 is in substantial radial alignment with tread footprints 308. This alternating pattern between tread pattern 504 and sidewalls 510, 511 repeats for the entire circumference of tire 500. As shown, cavities 512 extend in a radial direction from the center axis of exemplary tire 500 similar to FIG. 3A.

The second configuration shown in FIGS. 5A and 5B may be combined with the angled ribs, shown in FIGS. 4A and 4B, in another embodiment of the present invention.

Figure 6A:
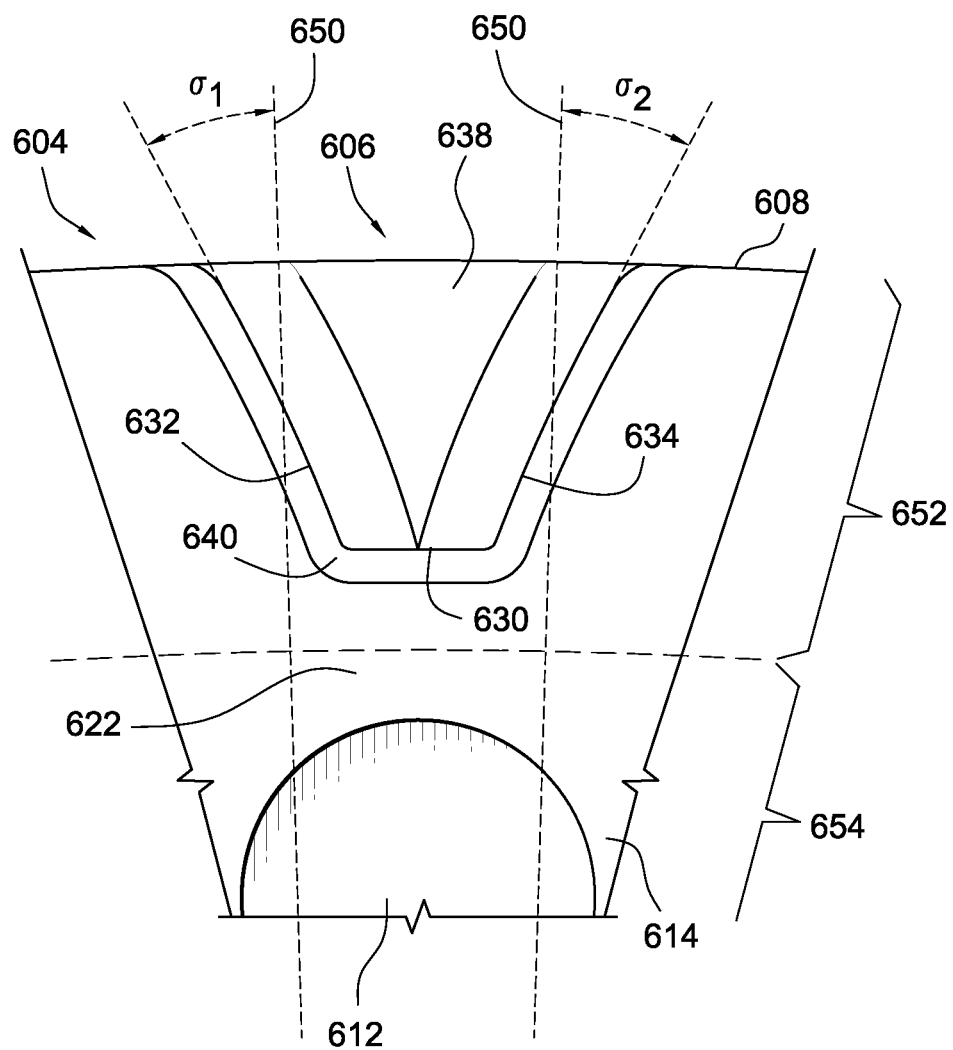
FIG. 6A is a side view of a tire having laterally extending tread grooves with angled walls that are in substantial radial alignment with the cavities in accordance with an embodiment of the present invention.
Figure 6B:
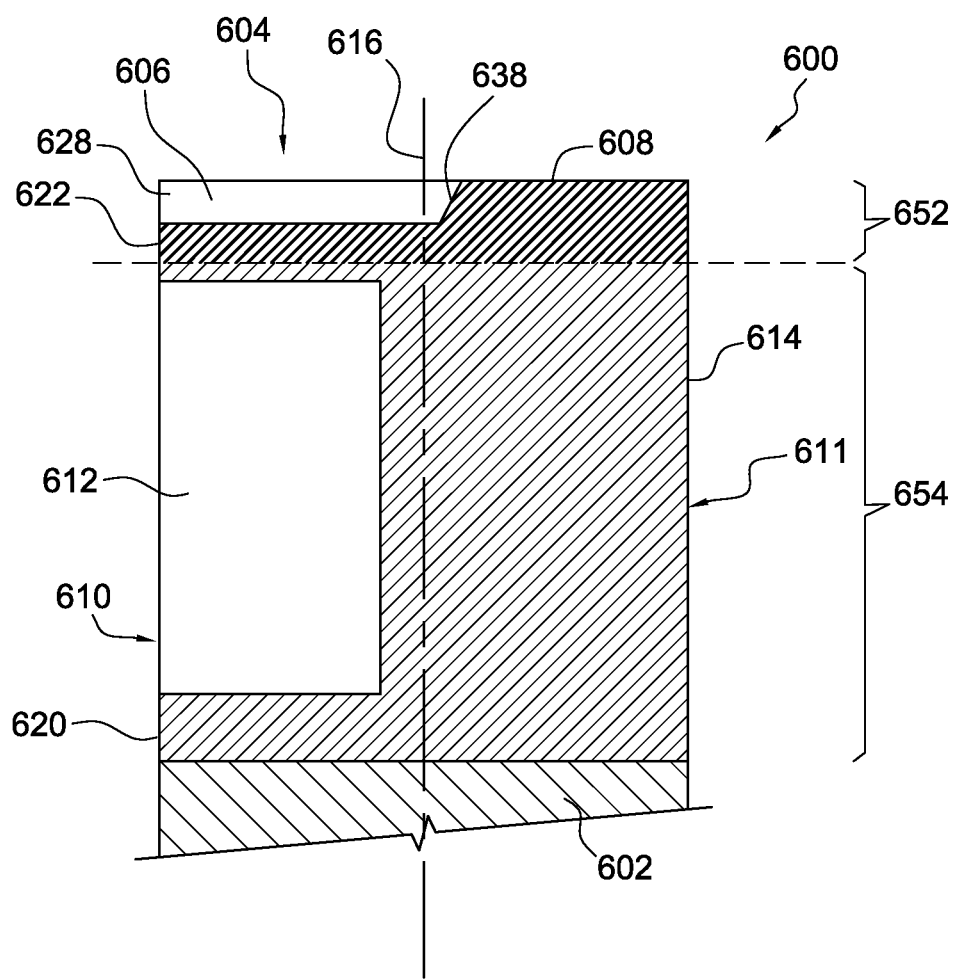
FIG. 6B is a cross-sectional view the tire in FIG. 6A.

In another aspect of the present invention, there is provided a tire 600 having an outer radial region 652 and central radial region 654. Tire 600 has an tread groove 606 having an angled first wall 632 and second wall 634 as shown in FIGS. 6A and 6B. Tire 600 comprises a central region 602, tread pattern 604, tread grooves 606, tread footprints 608, sidewalls 610, 611, cavities 612, ribs 614, central web 618 oriented about radial plane or centerline 616, inner circumferential member or hoop 620, and outer circumferential member or hoop 622. Outer radial region 652 includes tread grooves 606, while central radial region 654 includes web 618. Tread grooves 604 have an opening 628 toward the respective sidewall 610 and have a recessed base 630, first wall 632, second wall 634, and closed wall 638. Tread groove 606 also comprises a lip 640 that is a smooth, rounded region connecting sidewall 610 to tread groove 606. In one embodiment, either first wall 632, second wall 634, closed wall 638, or all walls have a smooth, rounded region connecting tread footprint 608 with tread groove 606.

Tire 600 in FIGS. 6A and 6B is shown having the same groove 606/cavity 612 alignment as in FIGS. 3A-3C. However, unlike FIGS. 3A-3C the tread grooves 606 have walls 632 and 634 that are substantially non-parallel with respect to each other and are angled relative to radial direction 650 as shown by $\sigma_1$ and $\sigma_2$ in FIG. 6A. In one embodiment, $\sigma_1$ is from 5° to 65°, e.g., from 10° to 45° or from 15° to 35°. In one embodiment, $\sigma_2$ is from 5° to 65°, e.g., from 10° to 45° or from 15° to 35°. In another embodiment the angle of $\sigma_1$ and $\sigma_2$ is approximately equal and more preferably $\sigma_1$ and $\sigma_2$ are both 15° from the radial direction. In another embodiment the absolute value of the open angles of $\sigma_1$ and $\sigma_2$ are approximately equal and more preferably $\sigma_1$ and $\sigma_2$ are both about 15° from the radial direction. The angle is measured from the mid-point of the groove wall and is established at the sidewall of the tire. In such embodiments having angled walls, when base 630 is parallel to the ground, first wall 632 and/or second wall 634 are substantially non-perpendicular to the ground, i.e., V-shaped.

In one embodiment recessed base 630 is substantially flat, i.e., the tread groove depth does not change by more than 10%, e.g., more than 8% or more than 5%, from sidewall 610 towards near the bottom of closed wall 638. Also the width of base 630 narrows from sidewall 610 towards closed wall 638.

As shown in FIG. 6A, tread groove 606 is aligned with cavity 612, such that the width of the tread groove 612 at the outermost surface is approximate to the width of cavity 612. Further base 630 is also aligned with cavity 612 and has a width that is smaller than the width of tread groove 612 at the outermost surface. Both widths decrease from sidewall 610 toward closed wall 638.

Although FIGS. 3A-6B show tire having two radial regions, those tires may also have any arrangement of radial regions as shown in FIGS. 1A-1C.

Figure 7:
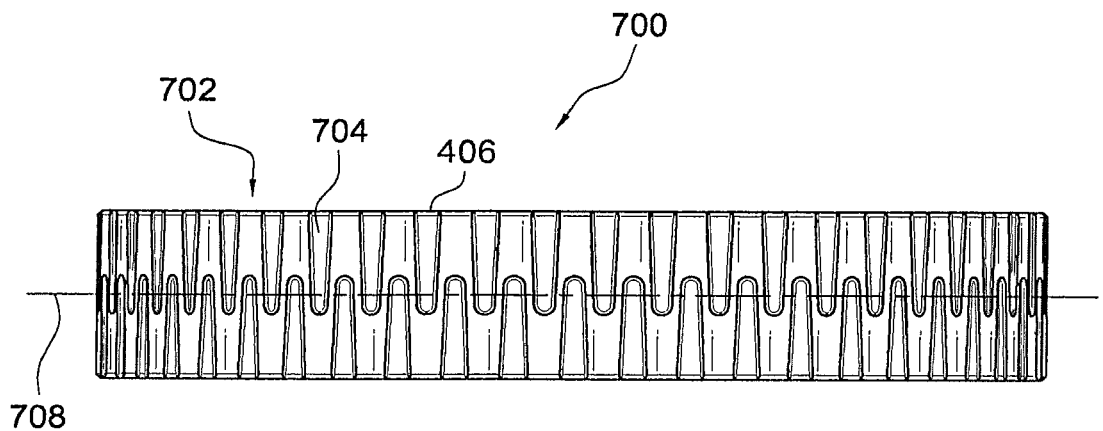
FIG. 7 is a front view of a tread pattern that crosses the radial plane in accordance with an embodiment of the present invention.
Figure 8:
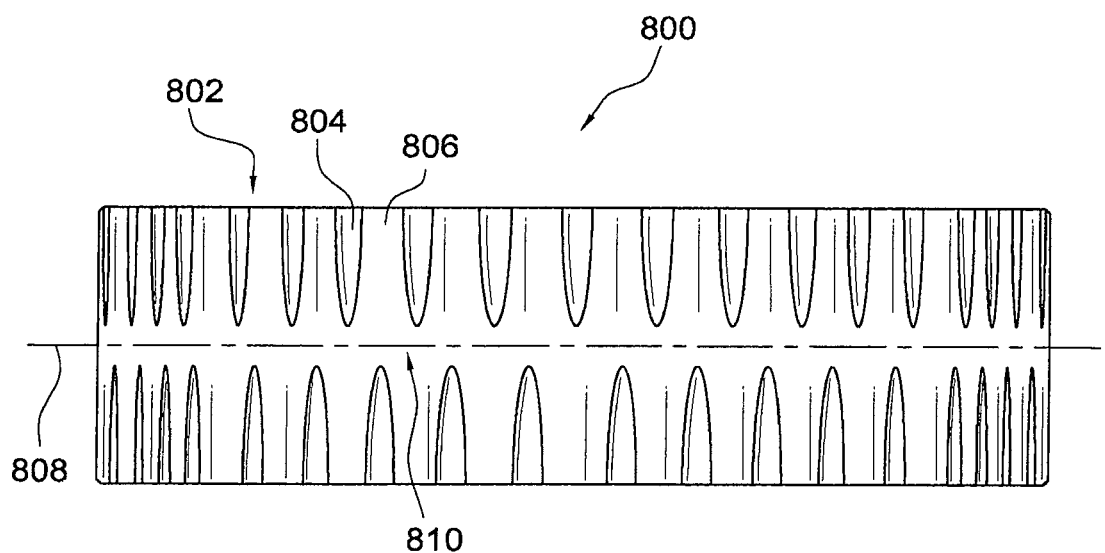
FIG. 8 is a front view of a tread pattern having a continuous footprint along the radial plane in accordance with an embodiment of the present invention.

In one embodiment the tread is formed together with the sidewalls using the same materials and mold. In other embodiments, a rubber tread may be added to tires of the present invention. Embodiments of the present invention may be used with various tread patterns as shown in FIGS. 7-8. FIG. 7 is a front view of a tire 700 having a tread pattern 702 in accordance with one embodiment of the present invention. Each tread groove 704 extends from a shoulder 406 and crosses radial plane 708. In such embodiments, tread grooves 704 remove some material from web (not shown) positioned in line with radial plane 708. Even though the web has less material, the overlapping position of groove 704 with respect to the sidewall cavities, as shown in FIG. 3C, unexpectedly provides sufficient strength for tire 700 and reduced stress and strain distribution across the tread.

FIG. 8 is a front view of a tire 800 having a tread pattern 802 in accordance with another embodiment of the present invention. As shown, each tread groove 804 extends from a shoulder 806 and ends short of a radial plane 808. The central web (not shown) is positioned in line with radial plane 808 and contacts the ground by a continuous footprint 810.

In one embodiment, a tire tread may combine grooves which extend past the radial plane with grooves that do not extend pass the radial plane.

In FIGS. 7 and 8, tread grooves 704, 804 have a similar shape and spacing around the outer circumference of tire 700, 800. The shapes of tread grooves may vary and include U-shaped grooves, V-shaped grooves, rectangular shaped grooves, etc. In one embodiment, grooves may have a flat bottom and tapered sides, with a curve at the end of groove. In another embodiment, the tread grooves may have a bottom that tapers up to the end of groove and tapered sides. Various other suitable shapes include those which allow for the easy removal of the mold used to make tire.

Figure 9A:
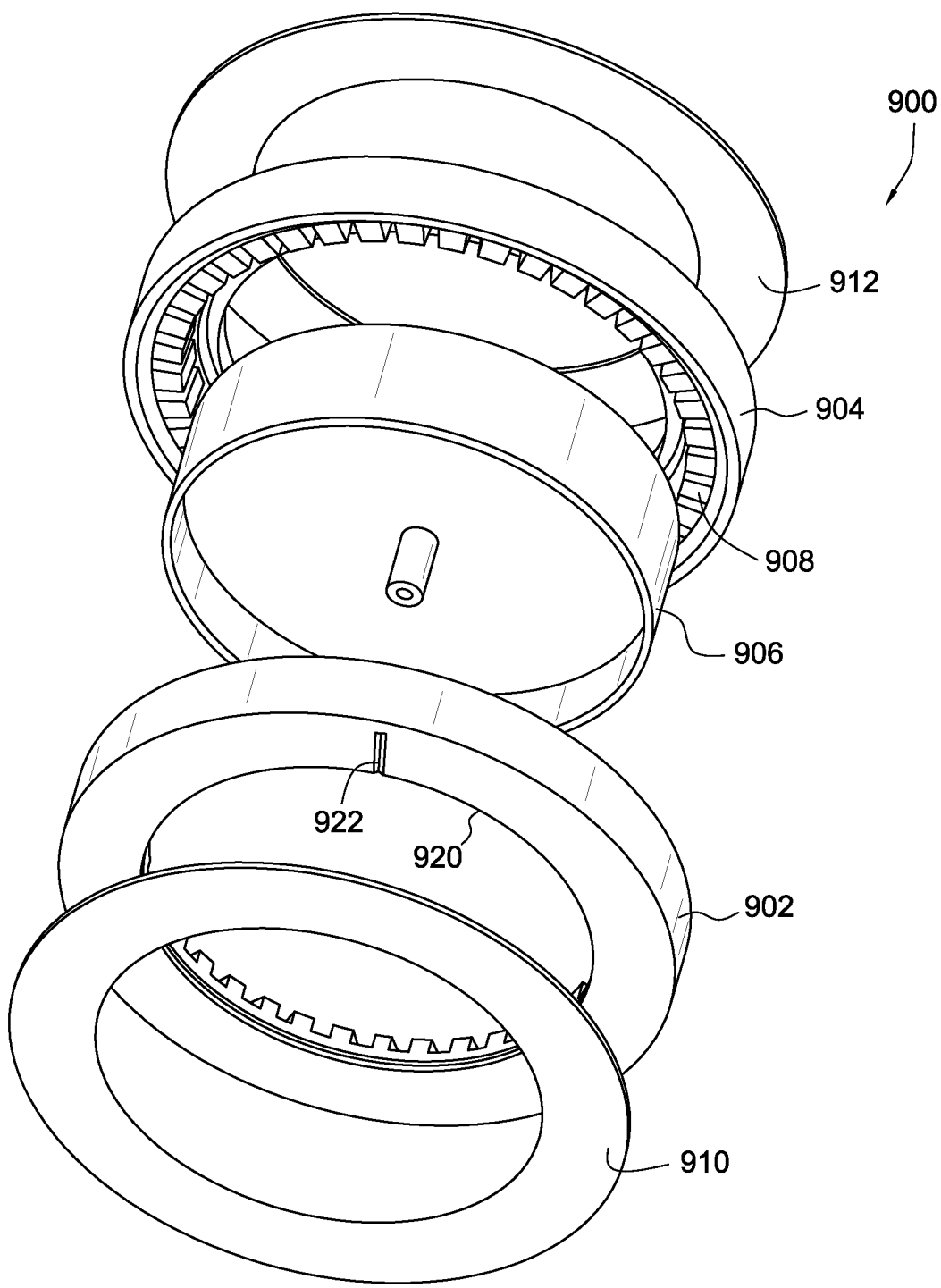
FIG. 9A is an exploded view of a tire mold in accordance with an embodiment of the present invention.
Figure 9B:
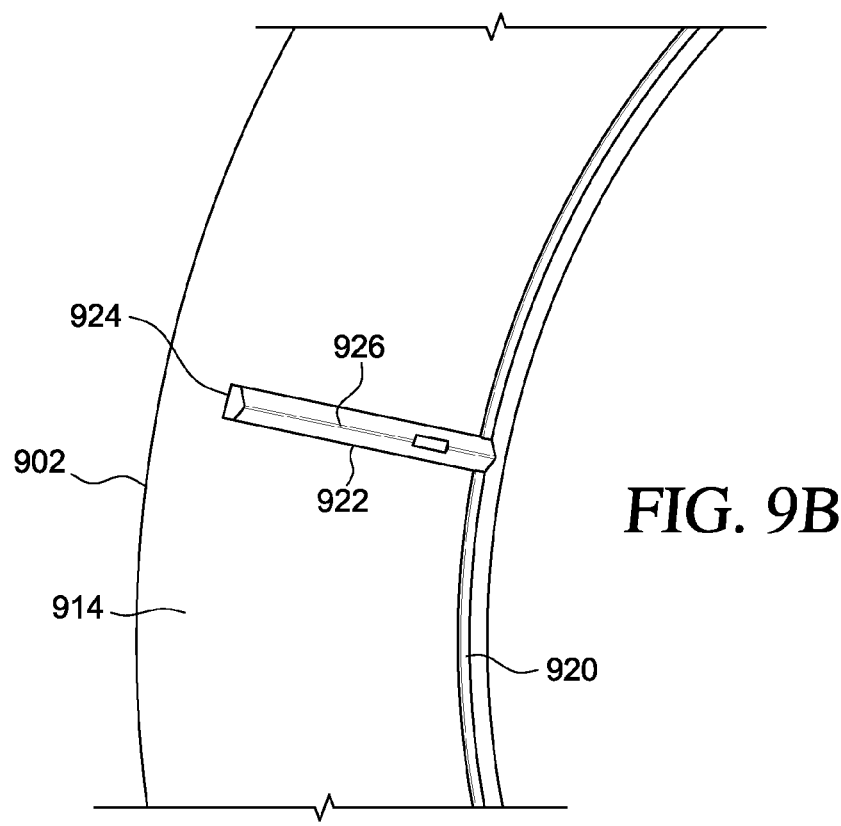
FIGS. 9B and 9C are detailed views of the mold half shown in FIG. 9A.
Figure 9C:
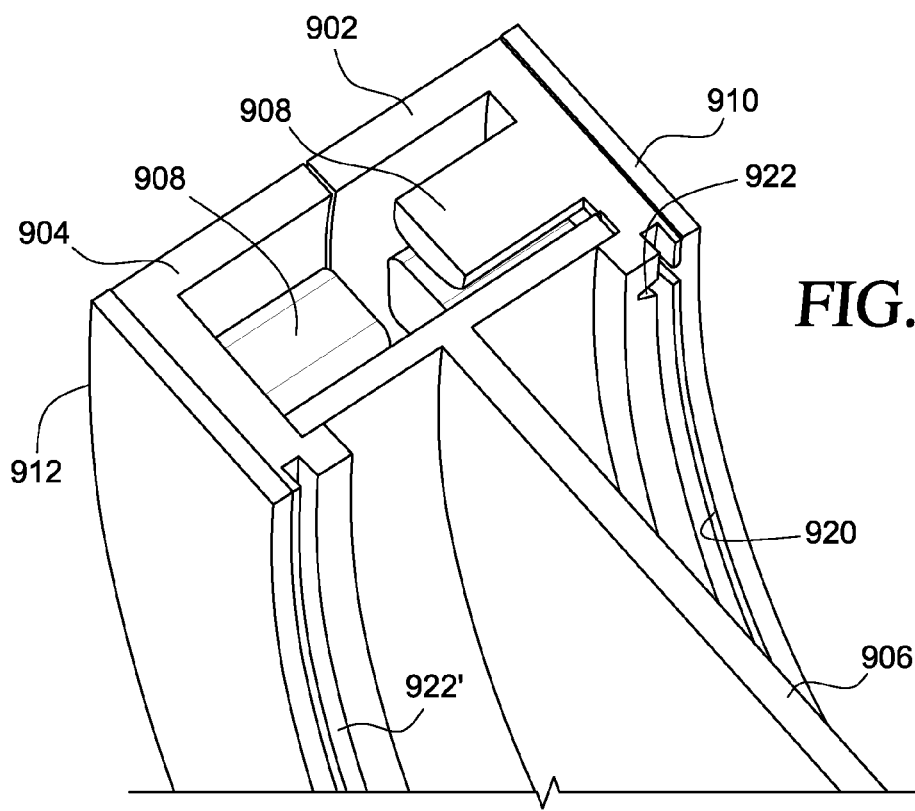

The tire of the present invention may be made using the following process and the exemplary mold assembly 900 shown in FIGS. 9A-9C. Exemplary molds are also shown and described in U.S. application Ser. No. 12/036,939, entitled "Non-Pneumatic Tire," filed Feb. 25, 2008, the entireties of which are incorporated herein by reference. Of course, other processes and mold designs may be used to form the tires of the present invention, and the process provided below is merely exemplary. Processes of the present invention provide for molding a tire having an outside diameter of approximately 25 inches (64 cm) to 190 inches (483 cm) and thus requires several tons of raw material or resin. Preferably, at least two different elastomeric materials are used, one for each of the radial regions.

In FIG. 9A, mold 900 assembly comprises two halves 902, 904 that are fitted over a metal rim 906. Each half 902, 904 has inverse or negative protrusions 908 that correspond to the cavities of tire. In addition, each half 902, 904 may have inverse or negative protrusions that correspond to the grooves (not shown) may also be used. Each half 902, 904 is preferably made from hardened steel, pre-hardened steel, aluminum, and/or beryllium-copper alloy. Mold 900 further comprises two channel covers 910, 912 which are fitted on the outer surface 914 of half 902 and the outer surface (not shown) of half 904. As shown in FIG. 9B, on the outer surface 914 there is an inner ledge 920 which travels along inner portion of half 902. Extending laterally outward from ledge 920 is a channel 922 having a stop wall 924 and opening 926. The opening 926 extends into the cavity formed by mold 900. As shown in FIG. 9B, the opening 926 is less than the entire length of channel 922. Channel 922 has a V-shape and is in fluid communication with ledge 920. In addition, as shown in FIG. 9C, half 904 also has a ledge 922' and a corresponding channel (not shown).

When channel cover 910 is pressed against half 902 there is a small gap near ledge 920 sufficient to insert a first polyurethane mixture. As mold 900 rotates in a vertical plane, the first polyurethane mixture is forced outward from ledge 920 into channel 922. The first polyurethane mixture fills up channel 922 and does not pass through opening 926 entire the first polyurethane mixture contacts stop wall 924. Once this occurs, the first polyurethane mixture enters the cavity through opening 926 and is forced outwardly in mold 900. In one embodiment, it is advantageous to fill mold 900 near the tread surface so as to prevent first polyurethane mixture from collecting on inverse protrusions 908. After curing the first polyurethane mixture, the second polyurethane mixture for the central and inner radial regions is inserted into the gap by the ledge and the process repeats for that radial region.

In one embodiment, mold 900 is rotated in a vertical plane from 1 to 10 g, e.g. from 2 to 8 g, or from 3 to 5 g. Preferably mold 900 should be rotated such that air is not entrapped in the polyurethane mixture.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

Prophetic Example 1

Materials

Adriprene™ LFM 2450 is a MDI terminated PCL prepolymer mixture having low free MDI content (typically 3.0%-4.0%) due to a monomer removal step in manufacture. The NCO content of the prepolymer is about 4.35% to 4.55% and the equivalent weight is about 923 to 966. Adriprene™ LFM 2450 may be cured with Caytur™ curatives to yield a high performance 93-95A elastomer, 59% rebound. Adriprene™ LFM 2450 is particularly suited for industrial non-pneumatic tires and wheels.

Caytur 31™ and Caytur™ 31-DA are blocked delayed action amine curatives for use primarily with isocyanate terminated urethane prepolymers. Such curatives comprise of a complex of MDA and sodium chloride dispersed in a plasticizer (dioctyl phthalate in case of Caytur 31 and dioctyl adipate in case of Caytur 31-DA) and optionally a pigment. Caytur 31 has a very low free MDA content (typical <0.5%). At room temperature, such curatives are virtually non-reactive. However at 115° C.-160° C., the salt unblocks and the freed MDA reacts rapidly with the prepolymer to form a tough elastomer. Amine group concentration is 5.78% in Caytur 31 and Caytur 31-DA. Hence the equivalent weight is 244 for Caytur 31 and Caytur 31-DA. These groups are blocked by sodium chloride.

ADIPRENE™ LFM 2450 cured with Caytur™ 31DA, both made by Chemtura Corporation, is used to make a prophetic tire having a configuration similar to FIGS. 3A-3C.

Table 3 shows a computer simulated comparison of a tire of FIGS. 3A-3C constructed with staggered cavities and substantially overlapping grooves of Example 1 with a conventional pneumatic rubber tire and a comparative solid polyurethane tire. The comparative solid polyurethane tire has a similar dimensions of a pneumatic rubber tire without any cavities or grooves.

TABLE 3

| Tire | Tire Weight | Tire Deflection | Max Speed | Ground Pressure | Rim Outside Diameter |
|---|---|---|---|---|---|
| Pneumatic Rubber (Actual) | 8,000 lbs (3,629 kg) | 18.9% (7.8 in) (20 cm) | 30 mph (48 km/h) | 102 psi (703 kPa) | 57 in (145 cm) |
| Comparative Solid polyurethane (Calculated) | 22,600 lbs (10,250 kg) | 8.6% (3.6 in) (9.1 cm) | 2.0 mph (3.2 km/h) | 77 psi (531 kPa) | 57 in (145 cm) |
| Example 1 (FEA) | 7,100 (lbs) (3,220 kg) | 7.8% (1.8 in) (4.6 cm) | 30 mph (48 km/h) | 160 psi (1,103 kPa) | 94 in (239 cm) |

As shown in the results of TABLE 3, the tire of Example 1 has similar characteristics as a conventional pneumatic rubber tire, which is surprising in view of the characteristics of the comparative solid polyurethane tire. Example 1 is made of a polyurethane elastomer, similar to the comparative solid polyurethane tire, but is lighter than the comparative solid polyurethane tire due to the presence of cavities and grooves therein. Further, the comparative solid polyurethane tire is subject to interior melt down due to the inability to dissipate heat generated during the rotation of the solid polyurethane tire. It is believed that the improved performance of Example 1 is attributable to the configuration of cavities and grooves.

Prophetic Example 2

The outer region is Adiprene™ L 167, a liquid TDI-terminated polyether prepolymer mixture, cured with MOCA. The central region is Adiprene™ LFM 1350 is a MDI terminated prepolymer mixture, cured with Caytur 31-DA. Adiprene™ LFM 1350 is a low free MDI having an NCO content of from 3.35-3.65%.

The outer and central region are formed in a mold using a spin casting procedure.

TABLE 4

| Tire | Outer Region Hardness | Central Region Hardness | Tire Deflection | Max Speed | Ground Pressure | Rim Outside Diameter |
|---|---|---|---|---|---|---|
| Example 2 (FEA) | 95A | 89A | 2.1 inches (5.3 cm) | 30 mph (48 km/h) | 145 psi (999.7 kPa) | 94 inches (239 cm) |

As shown in Table 4 the expected tire characteristics of a tire having two hardness regions is similar to example 1. In addition, the ground pressure of tire having two hardness regions is less.

What is claimed is:

1. A non-pneumatic tire comprising:
opposing, annular side portions;
a first radial region comprising side cavities on said opposing annular side portions that are circumferentially staggered with respect to laterally opposing side cavities, wherein said cavities extend substantially across a radial length of the first radial region; and
a second radial region comprising laterally extending tread grooves that are circumferentially offset relative to the cavities,
wherein the first radial region is formed of a first polyurethane material having a Shore A hardness of 70A to 95A, and the second radial region is formed of a second polyurethane material having a Shore A/D hardness of 85A to 60D that is at least 2A greater than the first radial region, and
wherein said side cavities are exclusively confined to said first radial region and define bar-shaped, radially aligned ribs therebetween, and said tread grooves are exclusively confined to said second radial region, and
wherein a length/width ratio of the ribs is at least 2.5, and a side area of the bar-shaped ribs on each side portion is at least 50% of a combined side area of the ribs and cavities.

2. A process for forming a non-pneumatic tire comprising:
forming by a spin-casting method a first polyurethane in a first radial region to a Shore A hardness of 70A to 95A;
forming side cavities on opposing, annular side portions in said first radial region that are circumferentially staggered with respect to laterally opposing side cavities, wherein said cavities extend substantially across a radial length of the first radial region and define bar-shaped, radially aligned ribs therebetween;
forming by a spin-casting method a second polyurethane in a second radial region to a Shore A/D hardness of 85A-60D that is at least 2A greater than the first polyurethane in the first radial region,
wherein the second radial region includes tire tread grooves, and said side cavities are exclusively confined to said first radial region, and said tread grooves are exclusively confined to said second radial region, and
wherein a length/width ratio of the ribs is at least 2.5, and a side area of the bar-shaped ribs on each side portion is at least 50% of a combined side area of the ribs and cavities.

3. The non-pneumatic tire of claim 1, wherein the first radial region has a first height that is from 40-95% of the tire's height.

4. The non-pneumatic tire of claim 1, wherein the second radial region has a second height that is from 5-45% of the tire's height.

5. The process of claim 2 for forming a non-pneumatic tire comprising a central web connecting inner and outer circumferential members which process comprises:
forming by a spin-casting method a first polyurethane in a first radial region to a Shore A hardness of 70A to 95A, which first radial region comprises ribs extending from opposing sidewalls to a central web and defining side cavities, wherein ribs on one side of the central web are circumferentially staggered relative to ribs on an opposite side of the central web; and forming by a spin-casting method a second polyurethane in a second radial region to a Shore ND hardness of 85A-60D, which second radial region comprises laterally extending tread grooves embedded in an outer surface of the outer circumferential member and extending inwardly from respective sides of the tire, wherein the tread grooves on one side of the tire are circumferentially offset relative to the ribs on the same side of the tire.

6. The non-pneumatic tire of claim 1, wherein a radial length of the side cavities defines the radial length of the ribs and wherein side portions of the tire each have at least 25 ribs.

7. The non-pneumatic tire of claim 2, wherein a radial length of the side cavities defines the radial length of the ribs and wherein side portions of the tire each have at least 25 ribs.

8. The non-pneumatic tire of claim 1, wherein the side area of the bar-shaped ribs on each side portion is no more than 66% of a combined side area of the ribs and cavities.

9. The non-pneumatic tire of claim 2, wherein the side area of the bar-shaped ribs on each side portion is no more than 66% of a combined side area of the ribs and cavities.

10. The non-pneumatic tire of claim 2, wherein the outer diameter of the tire is at least 60 inches.

11. The non-pneumatic tire of claim 2, wherein the outer diameter of the tire is at least 60 inches.

12. The non-pneumatic tire of claim 1, wherein the ribs and cavities radially extend substantially across the radial length of the annular side portions.

13. The non-pneumatic tire of claim 2, wherein the radial length of the ribs and cavities radially extend substantially across the radial length of the annular side portions.

14. The non-pneumatic tire of claim 12, wherein the radial length of the ribs and cavities is about 74% of the radial length of the annular side portions.

15. The non-pneumatic tire of claim 13, wherein the radial length of the ribs and cavities is about 74% of the radial length of the annular side portions.

16. The non-pneumatic tire of claim 1, wherein the wherein a radial length of the second radial region is between about 10-25% of a radial length of the tire's sidewall.

17. The non-pneumatic tire of claim 2, wherein the wherein a radial length of the second radial region is between about 10-25% of a radial length of the tire's sidewall.

* * * * *